United States Patent
Bourilkov et al.

(10) Patent No.: US 11,502,528 B2
(45) Date of Patent: *Nov. 15, 2022

(54) INTEGRATED DETERMINATION OF CHARGES REMAINING VIA A POWER BANK

(71) Applicant: DURACELL U.S. OPERATIONS, INC., Wilmington, DE (US)

(72) Inventors: Jordan Todorov Bourilkov, Bethany, CT (US); Sergio Coronado Hortal, Bethel, CT (US); Francisco Jose Restrepo, Fairfield, CT (US); John Rotondo, Trumbull, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/198,914

(22) Filed: Mar. 11, 2021

(65) Prior Publication Data
US 2022/0294243 A1 Sep. 15, 2022

(51) Int. Cl.
*H02J 7/00* (2006.01)
*H02J 7/34* (2006.01)

(52) U.S. Cl.
CPC ........ *H02J 7/0047* (2013.01); *H02J 7/00032* (2020.01); *H02J 7/00712* (2020.01); *H02J 7/342* (2020.01)

(58) Field of Classification Search
CPC .................................................. H02J 7/342
See application file for complete search history.

(56) References Cited

U.S. PATENT DOCUMENTS 6,946,817 B2    9/2005   Fischer et al.
7,471,059 B2   12/2008   Bayne et al.
(Continued)

FOREIGN PATENT DOCUMENTS

CN   104065146 A   9/2014
CN   104810900 A   7/2015
(Continued)

OTHER PUBLICATIONS

International Application No. PCT/US2021/065147, International Search Report and Written Opinion, dated Mar. 24, 2022.
(Continued)

*Primary Examiner* — Drew A Dunn
*Assistant Examiner* — Tynese V McDaniel
(74) *Attorney, Agent, or Firm* — Marshall, Gerstein & Borun LLP

(57) ABSTRACT

A portable power bank and remote server are described, where a rechargeable device includes a rechargeable battery that receives electric charge from the power bank via an electrical connection. Systems and methods facilitate determination of a "number of potential rechargings" of the rechargeable device battery via the power bank, e.g., how many times the power bank can charge the rechargeable device battery to a desired fuel gauge (e.g., 100%) before the power bank is depleted. The number of potential rechargings is determined by the remote server based upon the desired fuel gauge of the rechargeable device, present fuel gauges of the rechargeable device and the power bank, and charging efficiency factors corresponding to the rechargeable device and the power bank, respectively.

24 Claims, 12 Drawing Sheets

(56) References Cited

U.S. PATENT DOCUMENTS

| | | | |
|---|---|---|---|
| 7,701,173 | B2 | 4/2010 | Veselic |
| 7,791,319 | B2 | 9/2010 | Veselic et al. |
| 8,963,481 | B2 | 2/2015 | Prosser et al. |
| 9,444,274 | B2 | 9/2016 | Tu |
| 9,647,474 | B2 | 5/2017 | Fathollahi et al. |
| 9,726,763 | B2 | 8/2017 | Dempsey et al. |
| 9,830,764 | B1 | 11/2017 | Murphy |
| 9,983,312 | B2 | 5/2018 | Dempsey et al. |
| 10,416,309 | B2 | 9/2019 | Dempsey et al. |
| 10,432,012 | B2 | 10/2019 | Ha et al. |
| 2009/0156268 | A1 | 6/2009 | Kim et al. |
| 2015/0141081 | A1* | 5/2015 | Tu .......................... H02J 7/342 |
| | | | 455/573 |
| 2016/0099602 | A1 | 4/2016 | Leabman et al. |
| 2017/0288435 | A1 | 10/2017 | Miller et al. |
| 2018/0145530 | A1 | 5/2018 | Lee et al. |
| 2018/0246173 | A1 | 8/2018 | Singh et al. |
| 2019/0327550 | A1 | 10/2019 | Linden et al. |
| 2021/0021142 | A1 | 1/2021 | Murray, II |

FOREIGN PATENT DOCUMENTS

| | | |
|---|---|---|
| CN | 107222040 A | 9/2017 |
| EP | 3490097 B1 | 8/2019 |
| GB | 2401258 B | 6/2005 |
| WO | WO-2020137838 A1 | 7/2020 |
| WO | WO-2020222528 A1 | 11/2020 |

OTHER PUBLICATIONS

Internal Photos, OET Exhibits List, Federal Communications Commission, Office of Engineering and Technology, retrieved from the Internet at: «https://apps.fcc.gov/oetcf/eas/reports/ViewExhibitReport.cfm?mode=Exhibits&RequestTimeout=500&calledFromFrame=N&application_id=ZzvHwbtga3TbmxipGAQt%2BA%3D%3D&fcc_id=2AL O6-ORBITPB» made available only on Nov. 9, 2017.

Orbit 5000mAh Portable Charger Powerbank with Bluetooth Tracker—Black, HButler, retrieved from the Internet at: «https://www.amazon.com/dp/B0719MFHRD/ref=as_li_ss_tl?tag=mode065-20&_encoding=UTF8&psc=1 &linkId=398a91042563750e414c24c69ab645ff&language-en_US» made available May 17, 2017.

CoalBit Doubles As Power Bank and Bluetooth Tracker, retrieved from the Internet at: https://www.digitaltrends.com/mobile/coalbit-power-bank-kickstarter/ made available only on Mar. 23, 2016.

Goplug smart power bank (110v) gppbOHOv b&h photo video, retrieved from the internet at: https://www.bhphotovideo.com/c/product/1348369-reg/goplug_gppb0110v_110v_smart_power_bank.html/overview believed to be publically available by 2000-2020.

Instruction Manual Orbit, retrieved from the Internet at: <https://findorbit.zendesk.com/hc/en-us/articles/115001300973-Orbit-User-Guide-English-> made available Jan. 2020.

* cited by examiner

INTEGRATED DETERMINATION OF CHARGES REMAINING VIA A POWER BANK

FIELD OF THE INVENTION

The disclosure generally relates to power banks and methods for a power bank and, more particularly, to apparatus and methods for determining a number of times that the power bank at a given charge level can provide charge to a rechargeable device.

BACKGROUND

A power bank is a portable electronic device, chiefly including a rechargeable battery that is electrically connectable to one or more rechargeable devices, such as mobile computing devices. The power bank uses the electrical connection to supply electric charge to respective batteries of the rechargeable device(s). A user of a smartphone, for example, may carry a power bank so that, when the battery charge level of the smartphone is low, the user can connect the smartphone to the power bank (e.g., by USB or wireless charging means). Upon the power bank partially or fully recharging the smartphone battery, the user can continue to use the smartphone with less concern for depleting their smartphone battery.

Capacity of a power bank battery is typically expressed either in units of electric charge (e.g., milliampere-hours (mAh)) or units of energy (e.g., watt-hours (Wh)). As an example, a power bank may have a stated capacity of 12000 mAh, and the power bank may be used to charge a smartphone having a battery capacity of 3000 mAh. Applying simple math to the capacities, the user of the smartphone might assume that the power bank, starting from full capacity, can provide four full rechargings to the smartphone before the power bank is depleted and must be recharged. Alternatively, the user might speculate that the power bank, starting from full capacity, can provide eight "half-rechargings" of the same smartphone, each half-recharging bringing the smartphone from 50% to 100% charge level.

However, transfer of stored charge or energy from the power bank battery to the mobile computing device battery is not 100%. That is, at least some losses (or "efficiency losses") are certain to occur between the power bank battery and the rechargeable device battery during charging. Furthermore, a power bank battery typically loses at least some of its capacity over time. Thus, an actual capacity of the example power bank described above may be substantially below the stated capacity of 12000 mAh (e.g., lower than 9000 mAh, 8000 mAh, 7000 mAh, etc.). The user may be frustrated when their power bank is depleted (i.e., runs out of stored charge or energy) after providing substantially less charge to a rechargeable device (e.g., fewer rechargings) than the user expects.

SUMMARY

One embodiment includes a system (e.g. a remote server). The system includes one or more transceivers configured to exchange communication signals (e.g., radio frequency communication signals) with at least one of a power bank device and a rechargeable device. The power bank device includes a battery for supplying electric charge to a battery of a rechargeable device external to the power bank device. The system further includes one or more processors and a non-transitory memory storing computer-executable instructions. The instructions, when executed, cause the system to (1) receive, via the one or more transceivers, a first fuel gauge signal indicative of a present fuel gauge of the power bank, the present fuel gauge of the power bank device corresponding to a percentage of a capacity of a battery of the power bank device, (2) obtain, via the one or more transceivers, a second fuel gauge signal indicative of a present fuel gauge of the rechargeable device, the present fuel gauge of the rechargeable device corresponding to a percentage of a capacity of a battery of the rechargeable device, (3) determine a first charging efficiency factor of the power bank battery, the first charging efficiency factor being determined based upon the first fuel gauge signal, (4) determine a second charging efficiency factor of the rechargeable device battery, the second charging efficiency factor being determined based upon the second fuel gauge signal, (5) generate a number of potential rechargings of the rechargeable device from the power bank device, each of the potential rechargings corresponding to charging of the rechargeable device battery to a desired fuel gauge, the desired fuel gauge corresponding to a second percentage of the capacity of the rechargeable device battery, and the number of rechargings being determined based at least on the desired fuel gauge, the present fuel gauge of the rechargeable device, the present fuel gauge of the power bank device, and the first and second charging efficiency factors, and (6) provide, to a user interface, an indication of the number of potential rechargings of the rechargeable device.

Another embodiment includes a method performed via a remote server (e.g., via one or more processors and/or one or more communication modules thereof). The method includes receiving, from a power bank device configured to supply electric charge to a battery of a rechargeable device external to the power bank device (the "power bank"), a first fuel gauge signal indicative of a present fuel gauge of the power bank. The present fuel gauge corresponds to a first percentage of a capacity of a battery of the power bank ("power bank battery"). The method further includes via the rechargeable device, a second fuel gauge signal indicative of a present fuel gauge of the rechargeable device. The obtained signal indicates a present fuel gauge of the rechargeable device, which corresponds to a percentage of a capacity of a battery of the rechargeable device. The method still further includes determining a first charging efficiency factor of the power bank battery, and determining a second charging efficiency factor of the rechargeable device battery. The first and second charging efficiency factors are determined based upon the present fuel gauge of the power bank and the rechargeable device, respectively. The method still further includes generating a number of potential rechargings of the rechargeable device from the power bank via an electrical connection between the rechargeable device battery and the power bank battery. Each of the potential rechargings corresponds to charging of the rechargeable device battery to a desired fuel gauge, where the desired fuel gauge corresponds to a second percentage of the capacity of the mobile computing device battery. The number of rechargings is determined based upon the desired fuel gauge, the present fuel gauges of the rechargeable device and the power bank, and the first and second charging efficiency factors. The method still further includes providing, to a user interface, an indication of the number of potential rechargings of the rechargeable device.

In accordance with the teachings of the disclosure, any one or more of the foregoing aspects of an apparatus or a method may further include any one or more of the following optional forms.

In an optional form, the desired fuel gauge of the providing, to a user interface, an indication of the number of potential rechargings of the rechargeable device is substantially equal to 100% of the capacity of the mobile computing device battery. Alternatively, the desired fuel gauge is another percentage of the capacity of rechargeable device battery (e.g., 90%, 80%, 70%, 60%, 50%, etc.). In an optional form, when the rechargeable device battery receives electric charge via the power bank (i.e., such that the present fuel gauge of the rechargeable device rises toward the desired fuel gauge), the rechargeable device causes interruption of charging when the present fuel gauge reaches the desired fuel gauge (e.g., when the present fuel gauge is substantially equal to 90%, 80%, 70%, 60%, 50%, etc.).

In another optional form, the number of potential rechargings includes (1) a first recharging of the rechargeable device from the present fuel gauge (e.g., 30%, 40%, 50%, etc.) to the desired fuel gauge, and (2) a second recharging of the rechargeable device from substantially zero charge to the desired fuel gauge.

In still another optional form, the generation and provision of the number of potential rechargings is performed each time the rechargeable device is caused to be electrically connected to the power bank (e.g., each time the power bank detects that it has been connected to the rechargeable device via a USB cable).

In yet other optional forms, various combinations of communication and charging means are used by the mobile computing device and power bank. Communication means may include wired and/or wireless communication means (e.g., USB data communications, wireless radio frequency (RF) communications, etc.). Charging means may include various wired and/or wireless structure for electrically connecting the power bank to the mobile computing device (e.g., USB charging, Lightning charging, wireless charging means using the Qi standard, etc.).

In yet other optional forms, various combinations of communication and charging means are used by the mobile computing device and power bank. Communication means may include wired and/or wireless communication means (e.g., USB data communications, wireless radio frequency (RF) communications, etc.). Charging means may include various wired and/or wireless charging means (e.g., USB charging, Lightning charging, wireless Qi charging, etc.).

Embodiments may further include additional or alternative methods including operations of the apparatus describe above, and/or non-transitory computer readable media comprising computer-executable instructions that cause a processor to perform a method via apparatus described above.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. Each figure depicts a particular aspect of the disclosed system and methods, and each of the figures is intended to accord with a possible aspect thereof. Further, wherever possible, the following description refers to the reference numerals included in the following figures, in which features depicted in multiple figures are designated with consistent reference numerals.

There are shown in the Figures arrangements which are presently discussed, it being understood, however, that the present embodiments are not limited to the precise arrangements and instrumentalities shown, wherein.

Figure 1A:
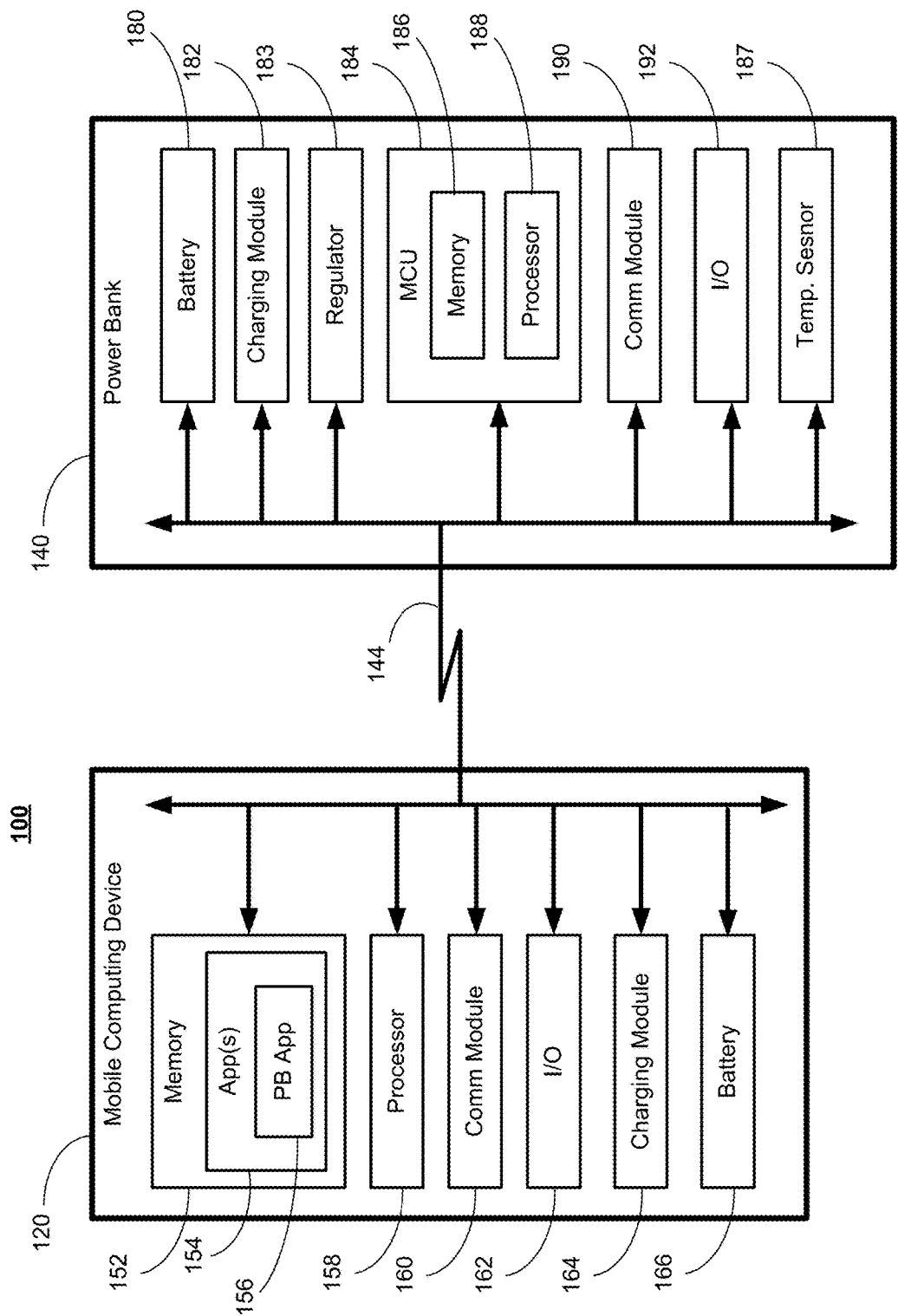
FIG. 1A illustrates an example computing environment, in accordance with one aspect of the present disclosure.

The Figures depict preferred embodiments for purposes of illustration only. Alternative embodiments of the systems and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Embodiments of the present disclosure include a portable power bank device ("power bank") and a rechargeable device, such as a mobile computing device (e.g., a smartphone) or rechargeable lithium or alkaline consumer batteries. Each of the power bank and the rechargeable device includes a respective internal battery ("power bank battery" and "rechargeable device battery," respectively). The power bank is configured to use its battery to supply electric charge to the rechargeable device battery, by way of an electrical connection between the power bank and the rechargeable device. The electrical connection may include, for example, a USB-C connection, micro USB connection, Lightning charging connection, a Qi-standard wireless connection, an AirFuel wireless connection, etc., and/or another wired or wireless structure for electrically connecting the rechargeable device to the power bank.

Embodiments of the present disclosure include, via a remote server, determining the number of rechargings that the power bank can provide to a rechargeable device before the power bank runs is depleted, given the present amount of charge or energy held at the respective batteries thereof. Particularly, embodiments of the present disclosure account for charging efficiency losses that occur in the rechargeable device and in the power bank, as well as losses of actual capacity of the power bank battery and/or rechargeable device battery over time. The remote server may be configured to store a plurality of user data respectively associated with a plurality of user accounts of respective power bank users. Accordingly, the remote server may associate a particular power bank with a particular user account maintained thereat. In some embodiments, the user accounts also include indications of rechargeable devices associated with the user. Accordingly, the user account may associate both the power bank and one or more rechargeable devices with one another. The power bank and/or the rechargeable device (and/or the application executing thereon) may be configured to update a user account associated with the power bank to include an indication of the rechargeable device when the power bank is used to recharge the rechargeable device. In some other embodiments, the remote server provides an interface (e.g., a web portal) via which users may utilize personal electronic devices (e.g., rechargeable devices and non-rechargeable devices such as desktop computers) to via which user profile information (e.g., a number of rechargings) can be viewed and user preferences can be set (e.g., a personal electronic device at which alerts should be received).

The remote server may be configured to store a plurality of user data respectively associated with a plurality of user accounts of respective power bank users. Accordingly, the remote server may associate a particular power bank with a particular user account maintained thereat. In some embodiments, the user accounts also include indications of rechargeable devices associated with the user. Accordingly, the user account may associate both the power bank and one or more rechargeable devices with one another.

Use of the methods and apparatus described herein advantageously facilitate more efficient and effective use of a power bank and minimize user frustration. Often, the actual number of rechargings that the power bank can provide to rechargeable devices may be fewer than a user expects, based upon the stated battery capacities of the power bank and the rechargeable devices. For example, although one may assume that a fully charged power bank having a stated capacity of 12000 mAh will provide four full rechargings to a 3000 mAh smartphone battery before the power bank is depleted, the power bank may in fact provide fewer rechargings (e.g., three full rechargings, two and a half rechargings, etc.). Because the methods and apparatus herein advantageously provide more accurate determinations of number of rechargings remaining for rechargeable devices associated with a user, the user may use the power bank more effectively (e.g., by charging the power bank in advance when the user anticipates that the power bank will be depleted) and/or experience less frustration based upon previously established expectations. Furthermore, methods and apparatus described herein may advantageously help the user identify more efficient ways to use the power bank to charge the rechargeable device. For example, methods and apparatus herein may determine that the power bank may effectively provide the most charge to the rechargeable device when the power bank is used to charge the rechargeable device from 10% to 60% (but not beyond 60%) during each recharging and thus allow the user to manage the power bank more efficiently. As another example, methods and apparatus described herein may determine that a power bank is capable of recharging rechargeable device A more efficiently than rechargeable device B. Accordingly, the user is able to manage which rechargeable devices should be recharged to maximize the recharging capacity of the power bank device. In accordance with the methods and apparatus described herein, the user profile associated with a power bank device is updated include an indication of a number of rechargings for the one or more rechargeable devices associated therewith.

Before further description, definitions of certain terms are provided, these terms being used throughout this detailed description.

As used herein, the term "power bank" refers to a portable electronic device usable for supplying electric charge to one or more rechargeable devices (e.g. mobile computing devices, such as a smartphone, a tablet, and/or a portable media player, or portable media player, devices powered by consumer rechargeable batteries, such as rechargeable AAA batteries, AA batteries, A batteries, and so on, or rechargeable industrial devices having integrated rechargeable batteries, such as door locks, automatic toilets, paper towel dispensers, hand driers, and so on). Accordingly, the term "power bank" encompasses battery packs external to the rechargeable device, including rechargeable battery packs and disposable battery packs. It should be appreciated any usage of the term "mobile computing device" herein envisions the alternative implementation of other types of "rechargeable devices. The power bank chiefly comprises a rechargeable battery ("power bank battery"), such as a rechargeable lithium-ion or lithium-polymer battery. More particularly, the power bank battery includes one or more cells (e.g., electrochemical cells), which may be arranged in series, in parallel, or in an alternative aspect, include cells arranged in series and in parallel. The power bank may charge the rechargeable device (i.e., supply electric charge to the rechargeable device battery) via wired means for electrically connecting the power bank to the mobile computing device (e.g., USB or Lightning cable connection) and/or via wireless means for the same (e.g., Qi-standard wireless charging means, AirFuel-standard wireless charging means). Means for electrically connecting the power bank to the rechargeable device are collectively referred to herein as an "electrical connection" between the power bank battery and the rechargeable device battery.

Capacity of a battery (e.g., of a rechargeable power bank battery) generally refers to a maximum electric charge or energy that can be held by the battery. Measured capacity of a battery may be expressed in units of electric charge (e.g., ampere-seconds, coulombs (C), milliampere-hours (mAh), and/or other suitable units) or in units of energy (e.g., watt-hours (Wh), joules (J), and/or other suitable units). "Nominal capacity" refers to an initial stated capacity of the battery (e.g., as stated by a manufacturer or retailer and corresponding to optimal capacity at the time of manufacture). "Actual capacity" refers to the battery's "real" or "true" capacity at a given time, and it will be understood that actual capacity will typically become less than nominal capacity and thus vary especially over a period of time. Actual capacity is typically measured in the same units as nominal capacity (e.g., when the battery's nominal capacity is rated in units of electric charge, the actual capacity is measured in the same). Actual capacity may be used in combination with a specific time to communicate the charge or energy held by the battery at that specific time, and thus two actual capacities determined at different times may be used to communicate the variance of charge or energy held by the battery over a time interval. "Present actual capacity" (or simply "present capacity") refers to the actual capacity of the battery at a present (current) time. "State of health" of the battery, as used herein, is a comparison of an actual capacity of the battery to a nominal capacity of the battery (e.g., actual capacity divided by nominal capacity, expressed as a ratio or percentage). Where techniques are described herein in relation to batteries having capacities expressed in units of electric charge, it should be understood that similar techniques may be applied in relation to batteries having capacities expressed in units of energy, given appropriate modifications (which will be described herein).

"Charge level," also referred to herein as "fuel gauge," refers to the measured/determined amount of charge or energy held by a battery (e.g., rechargeable power bank battery, rechargeable smartphone battery, etc.) at a given time. Charge level may be expressed as a percentage, i.e., the percentage representation of the amount of charge held by the battery in comparison to a capacity of the battery. Rechargeable devices such as smartphones or other mobile computing devices typically display their charge level in percentage form (e.g., 51%). It should be noted that, typically, a charge level of a battery is relative to the battery's present capacity, not the battery's nominal capacity. For example, if the present capacity of a given device battery is 8000 mAh compared to a nominal capacity of 10000 mAh, and the device indicates a present charge level of "100%," this means that the battery holds a charge of 8000 mAh (not 10000 mAh). Given the appropriate context, fuel gauge of a battery may be used herein as to refer to a corresponding amount of electric charge or energy held by the battery at a given time. For example, for an 8000 mAh battery, reference to the battery at 50% fuel gauge may refer to electric charge of 4000 mAh. As another example, for a 20 Wh battery, reference to the battery at 20% fuel gauge may refer to an amount of energy equal to 4 Wh.

A "charging" or "recharging" of a given device, as used herein, is a supplying of electric charge to a rechargeable battery of the device, thereby increasing the charge level of the device. A charging may, for example, increase the device charge level from 0% to 100%, from 0% to 40%, from 51% to 63%, from 55% to 100%, etc. The act of charging over time is referred to herein as a "charging session." Conversely, a "depletion" of a given device (e.g., of the power bank) is a spending of electric charge by the device which thereby decreases the charge level of the device. Depletion of the device may, for example, reduce the device charge level from 100% to 0%, from 100% to 65%, from 80% to 20%, from 33% to 0%, etc.

"Power bank" may be used at points herein to more specifically refer to the power bank battery and thus, given the appropriate context, these terms may be considered interchangeable. For example, where the term "power bank" is described in relation to electricity, capacity, provision of charge, etc., the term should be understood as referring more specifically to the battery of the power bank (e.g., "capacity of the power bank," "receiving charge from the power bank," "fuel gauge of the power bank," etc., specifically referring to the battery of the power bank). Similar terms may be used to describe a rechargeable device or a mobile computing device charged by the power bank (e.g., smartphone charged by the power bank). For example, terms such as "charging a mobile computing device" or "fuel gauge of a mobile computing device" may refer more specifically to the battery of the mobile computing device.

A power bank according to this disclosure may include a microcontroller (MCU). At a very high level, computing functionalities of the power bank MCU are typically limited to the functionalities that relate to (1) provision of charge from the power bank to rechargeable devices (e.g., allowing charge to be supplied, interrupting the supply of charge, etc.), (2) calculations pertaining to characteristics of electricity which may be used in furtherance of provision of charge (e.g., measurements or calculations of power, energy, current, voltage, resistance, capacity, and efficiency) and/or (3) communicating the calculations to other computing devices.

Although a power bank according to this disclosure may have some display capabilities (e.g., a blinking LED light or a power meter metric bar or display graphic indicative of power bank battery's charge level), the power bank according to this disclosure generally does not include a substantial display. For example, size of a power bank display screen may be limited such that the display screen does not have a viewing surface area greater than 25 cm$^2$, and/or greater than 16 cm$^2$. Additionally or alternatively, functionality of the power bank display screen is typically limited to only a simple numerical display (e.g., without the HD screen functionalities that are typically present in smartphones, tablets, notebook computers, etc.). As a result, the primary power draw from the power bank battery according to this disclosure is the charging of the rechargeable device (and not the operation of the limited power bank display itself, which requires substantially less power). Similarly, although a power bank as described herein may include some communication capabilities (e.g., RF communications, such as via Bluetooth Low Energy), different wired and/or wireless communication functionalities may be utilized depending on the device with which the power bank is in communication. For example communications with a rechargeable device may be implemented via low power and/or low computational communications protocols (e.g., Bluetooth Low Energy or WiFi). That said, the power bank may implement more complex protocols (e.g., cellular communications such as long term evolution (LTE) or new radio (NR)) for communication with the remote server.

A power bank is typically limited in physical size, weight, and/or dimensions, such that the power bank can easily be carried by the user of a mobile computing device (e.g., in a pocket, purse, backpack, etc.). Often, the power bank has a physical size and weight comparable to that of a smartphone. However, other physical forms of power banks are possible. For example, some power banks are substantially larger in size and capacity, and thereby more effective for supplying more charge, e.g., capable of charging devices a greater number of times, capable of substantially charging larger devices such as laptop computers (e.g., providing sufficient charge to charge the laptop computer battery from 10% to 30%, 40%, 50%, 60%, or more).

Furthermore, as a result of functionalities of a power bank being limited to the functionalities described above, the power bank generally has limited input/output (I/O) functionalities. For example, the power bank may not include a dedicated keyboard or touchpad. Additionally, although the power bank may include one or more ports (e.g., USB port, micro-USB port, etc., which may facilitate charging and/or data communications), typically, any ports included in the power bank are not adapted to receive a keyboard, mouse, peripheral touchpad, monitor or other peripheral I/O device.

Example Computing Environments

FIG. 1A illustrates an example computing environment 100 illustrating a power bank 140 according to this disclosure in which techniques described herein may be implemented. The environment 100 includes a rechargeable device 120, which may be a smartphone, tablet, wearable computing device, laptop computer, and/or other suitable computing device. Unless expressly disclosed otherwise, any description of the mobile computing device 120 envisions the alternate implementation of the description at a rechargeable device. The environment 100 further includes the power bank 140, which is generally configured to supply electric charge to one or more rechargeable devices (e.g., to the mobile computing device 120).

In addition to being electrically connected so that electric charge may be supplied from the power bank 140 to the mobile computing device 120, the mobile computing device 120 and power bank 140 may be communicatively connected via one or more communicative connections 144. The one or more communicative connections 144 may include a wireless radio frequency (RF) connection (e.g., via Bluetooth Low Energy (BLE), Zigbee, Universal Plug n Play (UPnP), WiFi low Power, 6LoWPAN, LoRa, and/or other suitable protocols). Additionally or alternatively, the one or more communicative connections may be implemented by a wired connection between the power bank 140 and the mobile computing device 120 (e.g., via wired USB or Lightning cable connection). In some embodiments, a single connection between the mobile computing device 120 and power bank 140 (e.g., a USB data/charging wired connection) may both electrically and communicatively connect the power bank 140 to the mobile computing device 120 and thereby facilitate a combination of communication and charging capabilities between the mobile computing device 120 and the power bank 140.

The mobile computing device 120 includes a memory 152 (i.e., one or more memories 152, e.g., RAM, ROM, etc.). The memory 152 is configured to store one or more applications 154 ("App(s)"), each of which comprises one or more sets of non-transitory computer-executable instructions. In particular, the one or more applications 154 includes a power bank application 156 ("PB App"), which may, for example, facilitate measuring, monitoring, and viewing of a number of rechargings remaining from the power bank 140 to the mobile computing device 120. In some embodiments, the one or more applications 154 use an application programming interface (API) that provides access to electrical characteristics of the mobile computing device 120, which are measured via internal circuitry of the mobile computing device 120 (e.g., voltage, current, resistance, etc.).

The mobile computing device 120 further includes a processor 158 (i.e., one or more processors, e.g., CPU, GPU, etc.), which may execute the non-transitory computer executable instructions included in the memory 152. The mobile computing device additionally includes a communication module 160 ("Comm Module"), which may establish communications and exchange communication signals with the power bank 140 via the one or more communicative connections 144. More particularly, the communication module 160 includes one or more transceivers configured to transmit and/or receive communication signals via communication connections with external devices. Communication signals to and/or from the communication module 160 may include wireless signals (RF signals) or wired communication signals (e.g., via USB data connection). The communication module 160 may also include one or more modems configured to convert between signals that are received/transmitted via the one or more transceivers and signals that are interpreted by the processors 158 and/or the PB app 156. The mobile computing device 120 may additionally include an I/O 162 for connecting one or more input devices and/or one or more output devices (e.g., a dedicated display screen such as a touchscreen).

It should be appreciated that alternate rechargeable devices may not include the I/O 162. For example, in embodiments where the rechargeable device 120 includes consumer batteries, an I/O of a personal electronic device interfacing with the remote server may instead be configured to display information regarding the rechargeable device.

The mobile computing device 120 includes a charging module 164 (e.g., a USB charger) chiefly configured to receive electric charge and direct the electric charge to a rechargeable battery 166 of the mobile computing device 120 ("mobile computing device battery 166"). The battery 166 is the primary power source of the mobile computing device 120. Usually, the battery 166 is internal to the mobile device 120 (e.g., fixedly or removably placed inside a cavity of the mobile computing device 120).

The charging module 164 of the mobile computing device 120 may also include circuitry to measure and/or process charging performance of the charging module 164. For example, the charging module 164 may include an analog to digital converter (ADC) configured to convert analog measurements of voltage, current, resistance, and/or other electrical characteristics at the mobile computing device 120 to digital values. Digital values can be transmitted via the communication module 160 to the power bank 140 via the one or more communicative connections 144 (e.g., via a wireless RF connection) or to a remote server via an alternate communicative connection.

The charging module 164 may include one or more charging ports (e.g., USB port or Lightning port) and/or additional circuitry for receiving and directing electric charge to the battery 166 when the charging module 164 receives electric charge from an external power supply (i.e., a supply of electric charge). The external power supply may be the power bank 140 according to this disclosure, and/or another external power supply (e.g., a wall outlet, a vehicle charging port, etc.).

Operations of the processor 158 may include operations for managing the supply of electric charge to the battery 166 via the charging module 164 (e.g., operating a switch to interrupt and/or resume the supply of electric charge to the battery 166).

In some embodiments described herein, the charging module 164 includes a voltage regulator (e.g., a DC-to-DC voltage converter). The voltage regulator may be configured, for example, to convert the voltage of a charging port of the mobile computing device 120 to a voltage of the battery 166. For example, in a mobile computing device 120 that is configured to receive power via a 5 volt (5V) USB charging port, the voltage regulator may include a step-down converter ("buck converter") configured to reduce the USB voltage to 3.6V or another suitable voltage corresponding to the battery 166. Similar voltage conversion may be performed based upon (1) the voltage of components of the charging module 164, which may vary based upon the charging means used (e.g., Lighting charging, Qi-standard wireless charging means, etc.), and (2) the voltage of the mobile computing device battery 166. Additional description of components of the charging module 164 will be provided with respect to FIG. 2.

Still referring to FIG. 1A, the power bank 140 includes a rechargeable battery 180. The power bank battery 180 is the primary power source of the power bank 140 itself, and is also the power source by which the power bank 140 supplies charge to mobile computing devices. The power bank battery 180 may be, for example, a lithium-ion battery, a lithium-polymer battery, and/or another type of secondary battery. The power bank battery 180 may comprise one or more electrochemical cells, connected in parallel and/or in series.

The power bank 140 includes at least one charging module 182 (e.g., a USB charger), which generally is configured to (1) receive and direct electric charge to the power bank battery 180 (e.g., charge received from an AC wall outlet, vehicle charging port, etc.), and (2) supply electric charge via an electrical connection to one or more mobile computing devices. In one specific implementation, where the power bank includes three charging modules 182, one of the charging modules 182 may be configured to allow recharging of the battery while the remaining two charging modules 182 are configured to simultaneously permit charging of two mobile computing devices. In possible embodiments, the electrical connection may be implemented via wired and/or wireless means (e.g., USB charging, Lightning charging, Qi-standard wireless charging means, AirFuel wireless charging means, and/or other suitable means).

The charging module(s) 182 may be coupled to a voltage regulator 183 (e.g., a DC-to-DC voltage converter). The voltage regulator 183 may be configured, for example, to convert a first voltage associated with a power source of the power bank 140 (e.g., a 120V AC wall outlet) to a second voltage of the power bank battery 180 (e.g., 3V, 3.6V, or 4.2V) while the power bank 140 is being recharged. Additionally or alternatively, the voltage regulator 183 may be configured to convert the voltage of the power bank battery 180 to still another voltage of a charging connection to the mobile computing device 120 (e.g., the voltage regulator 183 may include a step-up or "boost" converter configured to convert the power bank voltage to 5V for a USB charging connection) while the power bank 140 is supplying charge to the mobile computing device 120. Voltage conversion within the power bank 140 may vary based upon (1) the voltage of the power bank battery 180, and (2) the voltage associated with the charging means by which charge is provided to the mobile computing device 120 (e.g., Lighting charging, Qi wireless charging, etc.). Additional description of components of the charging module 182 will be provided with respect to FIG. 2.

The power bank 140 includes a microcontroller 184 (MCU, also referred to herein as a control module) comprising a memory 186 and a processor 188. The memory 186 (i.e., one or more memories) may include ROM, RAM, and/or other suitable types of computer memory. The processor 188 (i.e., one or more processors) may include a CPU and/or other suitable processing unit(s), which executes non-transitory instructions stored at the memory 186. In various embodiments, the MCU 184 performs measurements of electrical characteristics via the charging module(s) 182 (e.g., measurements of voltage of the battery 180, outflowing current from the battery 180, and/or other measurements described herein) and performs calculations based upon the values obtained via the performed measurements. The memory 186 may be configured to store one or more lookup tables for correcting the aforementioned measurements based upon the temperature of the environment 100 and/or the battery 180. Furthermore, the MCU 184 may control operations of the charging module 182 (e.g., operating a switch therein to interrupt and/or resume a supply of electric charge to the power bank battery 180 from an external power source, and/or a supply of charge from the power bank 140 to the mobile computing device battery 166).

The power bank 140 additionally includes a communication module 190 ("Comm Module") that includes one or more transceivers configured to exchange wired and/or wireless communication signals with the mobile computing device 120 via the one or more communicative connections 144 (e.g., RF digital communications using Bluetooth Low Energy, WiFi, LoRa, etc.) and/or with a remote server via an additional communicative connection. Depending on the particular communication protocol implemented via the communicative connections, the communication module 190 may also include one or more modems configured to convert between signals that are received/transmitted via the one or more transceivers and signals that are interpreted by the MCU 184. Non-transitory instructions stored at the power bank memory 186 may include instructions that, when executed by the processor 188, cause the communication module 190 to transmit indications of measured electrical characteristics and/or other calculations performed by the MCU 184 (e.g., indications of voltage, current, resistance, instantaneous power output, etc.) to the mobile computing device 120 and/or a remote server (not depicted).

The MCU 184 or the charging module 182 may particularly include an analog to digital converter (ADC) configured to convert analog measurements of voltage and/or other electrical characteristics at the power bank 140 to digital values. Digital values can be transmitted via the communication module 190 to the mobile computing device 120 via the one or more communicative connections 144 (e.g., via a wireless RF connection) or to a remote server.

Optionally, the power bank includes an I/O 192 for connecting one or more input devices and/or one or more output devices. In particular, the I/O 192 may include a power button which controls interruption/resumption of a supply of charge from the power bank battery 180 to a battery of a mobile computing device (e.g., to the battery 166 of the mobile computing device 120). In some embodiments, the I/O 192 may include one or more light emitting diodes (LEDs) and/or other graphical output, which may for example be an icon providing an indication of the charge level of the power bank battery 180 and/or whether charging is actively taking place.

In some additional embodiments, the power bank 140 also includes a temperature sensor 187 configured to sense a temperature of the environment 100 and/or the battery 180. For example, the temperature sensor 187 may be a thermistor. The MCU 184 may be configured to obtain indications of the temperature from the temperature sensor 187. As will be described below, actual battery capacity is dependent upon temperature. Accordingly, when the MCU 184 determines a measurement associated with the power bank battery 180 and/or the mobile computing device battery 166, the MCU 184 may apply a correction factor based upon the temperature sensed by the temperature sensor 187.

The environment 100 may include additional computing devices and/or components, in various embodiments. Moreover, where components of a device described herein are referred to separately, it should be understood that components may be combined, in some embodiments.

Figure 1B:
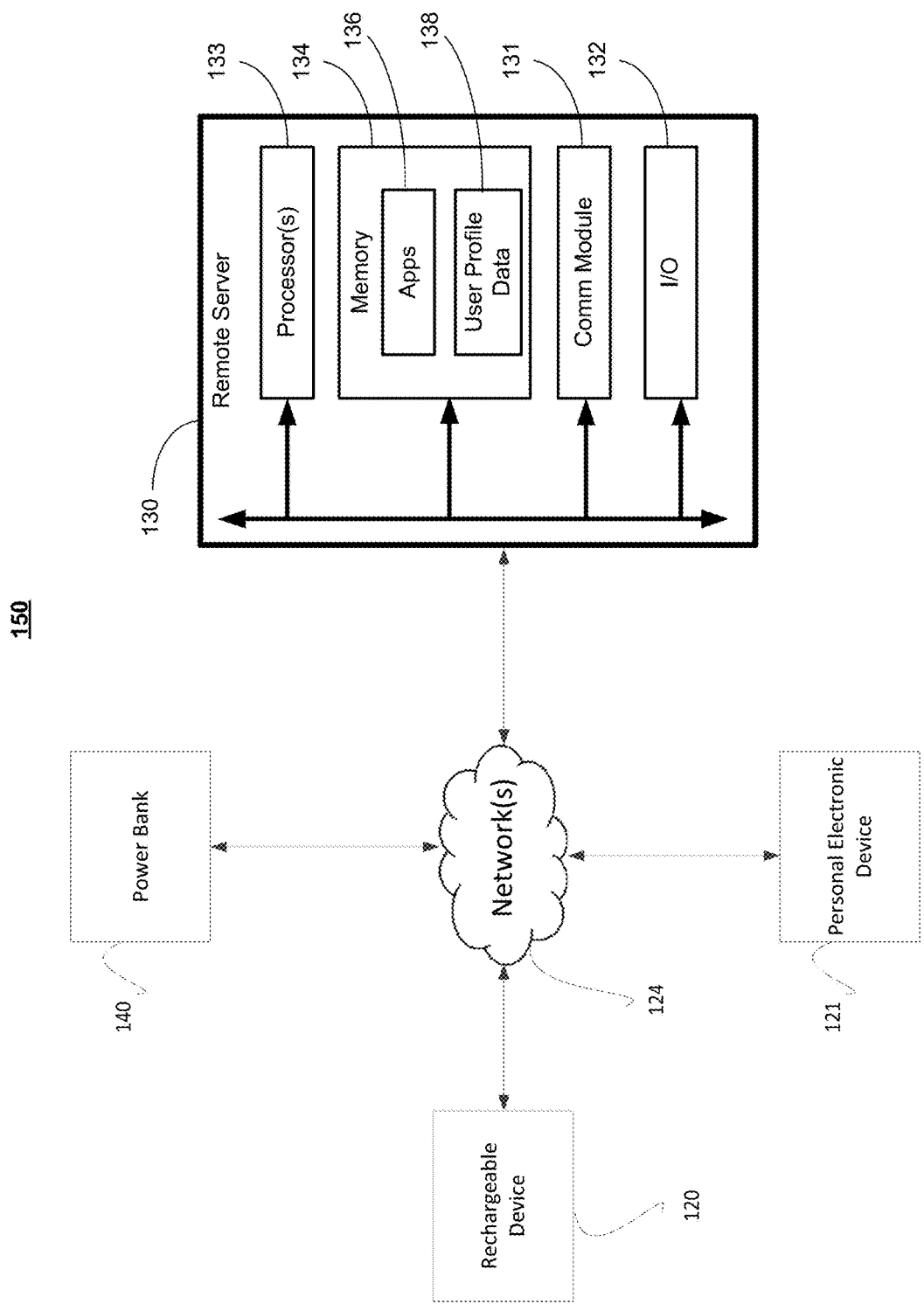
FIG. 1B illustrates an example computing environment including a power bank, a rechargeable device, personal electronic device(s), and a remote server, in accordance with one aspect of the present disclosure.

FIG. 1B illustrates an example computing environment 150 including the power bank 140, a rechargeable device 120 (such as the mobile computing device 120 described with respect to FIG. 1A), a personal electronic device 121, and a remote server 130. The power bank 140, the rechargeable device 120, the personal electronic device 121, and the remote server are communicatively coupled via one or more networks 124. While FIG. 1B depicts only a single power bank 140, a single rechargeable device 120, and a single personal electronic device 121, the environment 150 may include any number of power banks 140, rechargeable devices 120, and personal electronic devices 121 communicatively coupled with the remote server 130 via the networks 124.

The networks 124 may facilitate the communicative connections 144 of FIG. 1A and include one or more long range communication networks (e.g., a Wi-Fi network, an Ethernet network, a cellular communication network, etc.) and short range communication networks. To this end, in some embodiments, the power bank 140 utilizes the communication connections 144 between the power bank 140 and the rechargeable device 120 to facilitate communications between the power bank 140 and the remote server 130. In other embodiments, the communication module 190 of the power bank 140 is configured to include one or more transceivers capable of communicating directly with the remote server 130. In these embodiments, if the rechargeable device 120 does not include transceivers capable of communicating with the remote server 130 (e.g., in some embodiments where the rechargeable device 120 includes consumer rechargeable batteries), the rechargeable device 120 may utilize the communication connections 144 to transmit data to the power bank device 140, which relays the data to the remote server 130.

The personal electronic device 121 is an electronic device associated with a user of the power bank 140. The personal electronic device 121 may be a smart television, a smart home hub, a mobile computing device, or other suitable types of personal electronic devices. The personal electronic device 121 may be configured to receive alerts from the remote server 130 regarding operation of the power bank 140 and/or the rechargeable device 120 and to query data stored at the remote server 130 regarding the power bank 140 and/or the rechargeable device 120. In some embodiments, the personal electronic device 121 is the rechargeable device 120. In these embodiments, the personal electronic device 121 both receives charge from the power bank 140 and receives alerts from the remote sever 130.

The remote server 130 includes a memory 134 (i.e., one or more memories 134, e.g., RAM, ROM, etc.). The memory 134 may be configured to store one or more lookup tables for correcting the measurements associated with power bank 140 and/or the rechargeable device 120 based upon the temperature of the environment associated with the power bank 140 and/or the battery 180. Additionally, the memory 134 is configured to store one or more applications 136 ("Apps") which comprises one or more sets of non-transitory computer-executable instructions. In particular, the one or more applications 136 includes various applications for analyzing data received from the power bank 140 and/or the rechargeable device 120. For example, the one or more applications 136 may include an application configured to monitor a state of health of the power bank 140, an application configured to determine a number of times a power bank is capable of recharging one or more rechargeable devices 120, an application configured to interrupt the power bank 140 when it operates inefficiently, an application to generate a web dashboard for monitoring operation of the power bank 140 and/or the rechargeable device via the personal electronic device 121, and/or other applications that are configured to operate on data received from the power bank 140 and/or the rechargeable device 120. In some embodiments, the applications 136 are configured to share an API interface with the PB app 156 executing on the rechargeable device 120 to exchange data relating to the power bank 140 therebetween.

The memory 134 also includes user profile data 138. To this end, the remote server 130 may be configured to maintain user profiles for a plurality of users of respective power banks 140. Accordingly, for each user of a respective power bank 140, the user profile data 138 may include an identifier of the particular power bank 140, an identifier of one or more associated rechargeable devices 120, an identifier of one or more personal electronic devices 121 at which the user wants to receive alerts, a plurality of operating data associated with the power bank 140 and the rechargeable devices 120 (including operating data described elsewhere herein), user preference data (including user-defined threshold values), and/or other data associated with the user. The various identifiers may uniquely identify the respective device (e.g., a MAC address, a serial number, a MEID, a UICC, or other unique identifier). In some embodiments, the user preference data is set based on the user interacting with the PB app 156 of the rechargeable device 120 and/or via a web interface accessed via the personal electronic device 121.

The remote server 130 further includes a processor 133 (i.e., one or more processors, e.g., CPU, GPU, etc.), which may execute the non-transitory computer executable instructions included in the memory 134. In some embodiments, the remote server 130 operates in a cloud computing configuration. In these embodiments, the one or more processors 133 and the one or more memories 134 may be physically located in different hardware units. Accordingly, FIG. 1B should be understood to represent a logical relationship between the various components of the remote server 130.

The remote server 130 additionally includes a communication module 131 ("Comm Module"), which may establish communications and exchange communication signals over the one or more networks 124. More particularly, the communication module 131 includes one or more transceivers configured to transmit and/or receive via communication connections with external devices. The communication module 131 may also include one or more modems configured to convert signals that are received/transmitted via the one or more transceivers to signals that are interpreted by the processors 133. The communication module 131 may be configured to communicate with additional or alternative device not shown in FIG. 1B. For example, in some embodiments, the applications 136 may be configured to generate one or more alerts related to operation of the power bank 140, including the number of rechargings the power bank 140 can provide to one or more rechargeable devices 120. Accordingly, the communication module 131 may be configured to transmit messages to a push server that pushes the alert to the rechargeable device 120 and/or the personal electronic device 121 via a push messaging protocol.

The remote server 130 may additionally include an I/O 132 for connecting one or more input devices and/or one or more output devices (e.g., devices connected to one or more physical ports of the remote server 130 to enable monitoring and/or configuration of the remote server 130).

Figure 2:
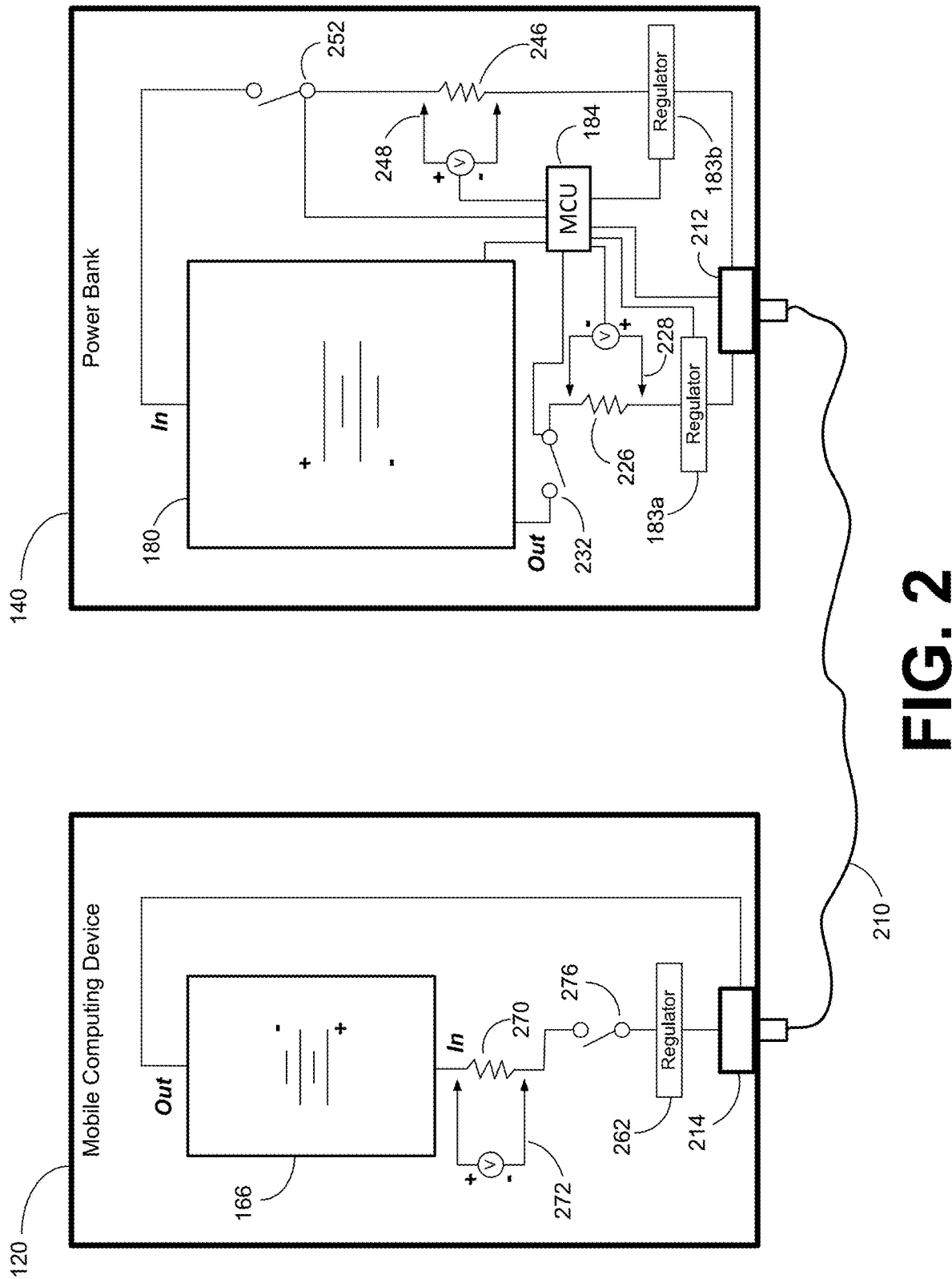
FIG. 2 illustrates example components of the power bank and the rechargeable device and/or mobile computing device of FIGS. 1A and 1B, in accordance with one aspect of the present disclosure.

FIG. 2 illustrates example conventionally known electrical components of the rechargeable device 120 of FIG. 1B (including the mobile device 120 of FIG. 1A) and power bank 140 of FIGS. 1A-1B, suitable for use in the portable power bank devices described herein. Although a limited number of electrical components are described with respect to FIG. 2, these are merely provided for general illustration of the power banks 140 and methods described herein, and thus it should be understood that the rechargeable device 120 and/or power bank 140 may include additional, fewer, and/or alternate components to those described herein, in various embodiments (e.g., other electrical circuitry, and/or any of the components described with respect to FIG. 1A-1B). Thus, arrangements of the electrical components generally described herein may vary from the arrangement shown in FIG. 2.

At a high level, electrical components depicted in FIG. 2 facilitate supply of electric charge from the power bank battery 180 to the rechargeable device battery 166 via an electrical connection between the power bank battery 180 and the rechargeable device battery 166. The electrical connection between the power bank battery 180 and the rechargeable device battery 166 electrically connects the respective batteries thereof to facilitate the supply of charge from the power bank battery 180 to the rechargeable device battery 166. In some embodiments, at least some the electrical components described herein may be disposed in one or more integrated circuits in the rechargeable device 120 and/or in the power bank 140.

In the embodiment shown in FIG. 2, the electrical connection 210 is a wired electrical connection (e.g., a USB-C charging cable, micro-USB cable, Lighting cable, or other physical connecting structure) that connects an electrical port 212 of the power bank 140 to an electrical port 214 of the mobile computing device 120. Additionally or alternatively, in some embodiments, the electrical connection 210 may include a wireless electrical connection (e.g., Qi-standard wireless charging connection). Moreover, in some embodiments, the electrical connection 210 may be implemented by the same structure that provides the communicative connection(s) 144 as described with respect to FIG. 1. That is, a single connection between the mobile computing device 120 and the power bank 140 (e.g., a USB wired data/charging wired connection) may both electrically and communicatively connect the mobile computing device 120 and the power bank 140.

The power bank battery 180 supplies electric charge via an outflowing electric current from the power bank battery 180. An instantaneous power output of the power bank battery 180 can be calculated (e.g., by the power bank MCU 184) by multiplying an instantaneous value of the outflowing electric current by an instantaneous voltage of the power bank battery 180. Voltage of the power bank battery 180 (e.g., voltage across two terminals of the power bank battery 180) may be measured, for example, by the MCU 184 via a voltmeter disposed at the power bank battery 180. Outflowing current may be measured by the MCU 184 via use of a resistor 226 (e.g., a shunt resistor) which is electrically arranged in series with the power bank battery 180, and which has a known resistance. When current passes through the resistor 226, the MCU measures a voltage drop across the resistor 226 via a voltmeter 228. The ADC in the power bank MCU 184 may convert analog voltage measurements to digital voltage measurements. The MCU 184 may divide the voltage drop across the resistor 226 by the known resistance of the resistor 228 to determine the value of the electric current passing through the resistor 226 and hence, the value of the outflowing current of the power bank battery 180).

In some embodiments, control of the supply of electric charge from the power bank battery 180 is facilitated via a power bank switch 232. The switch 232 in an open state (as shown in FIG. 2) prevents the supply of electric charge from the power bank battery 180, whereas the switch 232 in a closed state allows the supply of electric charge. The switch 232 may be controlled, for example, by the power bank MCU 184. Additionally or alternatively, in some embodiments, the switch 232 may be controlled based upon communications transmitted to the power bank 140 by the rechargeable device 120 and/or the remote server 130 of FIG. 1B, which communications may be based upon corresponding user input.

The power bank 140 includes a voltage regulator 183a (e.g., the voltage regulator 183 as shown in FIG. 1, for example a DC-to-DC voltage converter). The voltage regulator 183a may be configured to convert a first voltage of the power bank battery 180 (e.g., 3V, 3.6V, or 4.2V) to a second configured voltage of the electrical connection 210 (e.g., 5V for USB charging). Accordingly, in some embodiments, the voltage regulator 183a includes a step-up or "boost" converter configured to increase the voltage. Additionally or alternatively, in some embodiments, the voltage regulator 183a includes a step-down or "buck" converter to decrease the voltage (e.g., when the power bank battery 180 voltage is greater than the electrical connection 210 voltage). Effectively, voltage regulation by the voltage regulator 183a may vary based upon (1) the voltage of the power bank battery 180, and (2) the voltage associated with the electrical connection 210. Regulated electric current (e.g., having passed through the voltage regulator 183a) may be supplied to the electrical connection 210 by way of the power bank electrical port 212. Notably, by performing the measurement of outflowing current between the battery 180 and the voltage regulator 183a, the outflowing current measurement reflects outflowing current from the battery 180 itself (e.g., outflowing current from a terminal of the battery 180), thereby avoiding inaccuracies that may be caused by losses of energy and/or changes in value of the current occurring at the voltage regulator 183a.

The power bank 140 may additionally include a second, separate electrical pathway for facilitating supply of inflowing electric charge to the power bank battery 180 (e.g., inflowing electric charge from an AC wall outlet, vehicle charging port, and/or other source of charge for the power bank 140). Elements of this second pathway may generally be similar to the elements described herein for directing outflowing electric charge from the power bank battery 180. Accordingly, the second pathway may include, for example, a voltage regulator 183b (e.g., to convert a first voltage of an electrical connection supplying charge to the power bank 140, to a second voltage of the power bank battery 180). Electrical current, upon passing through the voltage regulator 183b may pass through a resistor 246 (e.g., a shunt resistor). Electric current passing through the resistor 246 may be measured in a manner similar to that described herein regarding outflowing current through the resistor 226 (e.g., by the MCU 184 via a voltmeter 248). Furthermore, supply of inflowing electric charge to the battery 180 may be controlled via a switch 252.

Electrical current is received at the rechargeable device 120 from the electrical connection 210 by way of the rechargeable device port 214. The received electrical current may flow to a voltage regulator 262 of the rechargeable device 120. The voltage regulator 262 may be configured to convert the voltage of the electrical connection 210 (e.g., 5V for USB charging) to another voltage of the rechargeable device battery 166 (e.g., 3V, 3.6V, or 4.2V). Accordingly, in some embodiments, the voltage regulator 262 includes a step-down converter configured to decrease the voltage. Additionally or alternatively, in some embodiments, the voltage regulator 262 includes a step-up converter configured to increase the voltage.

Electric charge is received at the rechargeable device battery 166 by way of an inflowing electric current. Voltage of the rechargeable device battery 166 may be measured, for example, by a voltmeter in the battery 166. The value of the inflowing electric current may be measured via a resistor 270 (e.g., a shunt resistor) which is electrically arranged in series with the rechargeable device battery 166, and which has a known resistance. When current passes through the resistor 270, the rechargeable device 120 measures a voltage drop across the resistor 270 via a voltmeter 272. The ADC in the rechargeable device processor may convert analog measurements of voltage in the rechargeable device 120 to digital voltage values. The processor of the rechargeable device (e.g., processor 158) may divide the voltage drop across the resistor 270 by the known resistance of the resistor 270 to determine the value of the electric current passing through the resistor 270 and hence, the value of the inflowing current to the rechargeable device battery 166). Notably, by performing the measurement of inflowing current between the voltage regulator 262 and the battery 166, the inflowing current measurement reflects the inflowing current to the rechargeable device battery 166 itself (e.g., flowing into a terminal thereof), thereby accounting for potential losses of energy and/or changes in value of the current occurring at the voltage regulator 262. The processor of the rechargeable device 120 may calculate instantaneous power input to the rechargeable device battery 166 by multiplying an instantaneous value of the inflowing electric current by a corresponding instantaneous voltage of the rechargeable device battery 166.

In some embodiments, control of the supply of electric charge to the rechargeable device battery 166 is performed via a rechargeable device switch 276. The switch 276 in an open state (as shown in FIG. 2) prevents the supply of electric charge to the rechargeable device battery 166, whereas the switch 276 in a closed state allows the supply of electric charge. The switch 276 may be controlled, for example, by the rechargeable device 120 (e.g., by the processor 158 according to instructions from the power bank app 156). Additionally or alternatively, in some embodiments, the switch 276 may be controlled based upon communications transmitted to the rechargeable device 120 by the power bank 140 and/or the remote server 130.

Via the electrical arrangement as shown in FIG. 2, supply of electric charge from the power bank battery 180 to the rechargeable device battery 166 may be performed and controlled in manner that facilitates efficient use of the power bank 140, as will be understood from this detailed description.

Factors in Charging Efficiency and Number of Rechargings Remaining

Generally, charging efficiency between a power bank battery (e.g., power bank battery 180 from FIG. 2) and a rechargeable device battery, such as a mobile computing device battery (e.g., mobile computing device battery 166 from FIG. 2) can be represented as a comparison of an amount of power output by the power bank battery ("power output") to an amount of power received to the rechargeable device battery ("power input"). More particularly, measured power input ($P_{in}$) at the rechargeable device battery can be divided by measured power output ($P_{out}$) at the power bank battery at a corresponding time to determine the charging efficiency between the power bank battery and the rechargeable device battery. The charging efficiency may be represented as a ratio between 0 and 1.0 (or alternatively, as a percentage between 0% and 100%). For example, given $P_{out}$ of 10.5 W and $P_{in}$ of 7 W at a corresponding time, the charging efficiency at that time is approximately 0.67 or 67%.

The transfer of electric charge from the power bank battery to a rechargeable device is not 100%. Often, efficiency of charging is less than 90%, 80%, 70%, 60%, etc. Thus, when significantly more charge or energy is lost by the power bank than is received by the rechargeable device, the effective number of rechargings that the power bank can provide to the rechargeable device on a single charging of the power bank (i.e., without recharging the power bank via an AC wall outlet or other power supply) is reduced. A user of a power bank is typically not aware that charging efficiency can be significantly lower than 100%, and thus, the user often assumes that he or she can divide the power bank capacity by the rechargeable device capacity to determine the number of rechargings remaining. The user might, for example, assume that a 12000 mAh power bank can fully recharge a 3000 mAh smartphone battery four times, or half-recharge the same smartphone battery eight times, before the power bank is depleted and must be recharged). Users may be frustrated when, due to efficiency losses while recharging one or more rechargeable devices, the power bank provides fewer rechargings than expected before being fully or near-fully depleted.

A number of factors can contribute to loss of charging efficiency (i.e., loss of charge or energy in transfer between the rechargeable device and the power bank) and hence, decreased number of rechargings available to a rechargeable device using a power bank. Broadly speaking, efficiency loss may be attributed to one or more of (1) circuitry of the power bank, (2) circuitry of the rechargeable device, (3) the electrical connection carrying charge between the power bank and the rechargeable device (e.g., electrical connection 210 from FIG. 2), and (4) state of health of the power bank and/or the rechargeable device. Further detail regarding each of these sources of efficiency loss is provided below.

First, efficiency loss can be attributed at least in part to circuitry of the power bank. In particular, significant efficiency loss often occurs when voltage is converted up (or down) at a power bank voltage regulator (e.g., voltage regulator 183a from FIG. 2), which converts the voltage from a first voltage of the power bank battery to a second voltage of the electrical connection between the power bank and the rechargeable device. For example, a lithium-ion power bank battery may have a voltage of 4.2V when the power bank battery is at 100% fuel gauge, and efficiency may be lost when the voltage converter steps the 4.2V battery voltage up to 5V for a USB electrical connection. This efficiency loss may increase as the power bank battery drains. For example, when a lithium-ion power bank battery drains, the battery voltage may gradually drop from 4.2V toward a minimum rated voltage of 3V. As the difference between the voltages of the power bank battery and the electrical connection increases, larger efficiency losses may be encountered. Furthermore, the efficiency loss at the power bank voltage regulator may vary based upon outflowing current or power from the power bank. For example, according to common charging protocols (e.g., "CC/CV charging," as will be described herein), outflowing current of the power bank battery to the mobile computing device typically tapers off as the rechargeable device fuel gauge approaches 100%. Voltage regulator efficiency decreases when the value of the outflowing current decreases, and thus, charging may be less efficiency as the rechargeable device fuel gauge approaches 100%. Total efficiency losses at the power bank circuitry may add up to 10% efficiency loss (i.e., 10% of energy lost between the power bank battery output terminal and the electrical connection), 15% efficiency loss, 20% efficiency loss, or in some cases even more.

Second, efficiency loss can be attributed to circuitry of the rechargeable device receiving charge. In particular, significant efficiency loss often occurs when voltage is converted down (or up) at the rechargeable device voltage regulator (e.g., voltage regulator 262 from FIG. 2), the voltage being converted from a first voltage of the electrical connection (e.g., 5V) to a second voltage of the rechargeable device battery (e.g., 3V when the rechargeable device is at 0% fuel gauge). The larger the difference between the electrical connection voltage and the rechargeable device battery voltage, the larger the efficiency loss may occur at the rechargeable device voltage regulator. Furthermore, the efficiency loss at the rechargeable device voltage regulator may vary based upon the inflowing current to the rechargeable device (similarly to the power bank voltage regulator with outflowing current). That is, as inflowing current decreases (e.g., as the rechargeable device battery fuel gauge increases, according to CC/CV charging protocol), the rechargeable device voltage regulator becomes less efficient. As with the power bank circuitry, total efficiency losses at the rechargeable device circuitry may add up to 10%, 15%, 20%, or more.

Third, efficiency loss may be attributed to the electrical connection between the power bank and the rechargeable device. That is, as a result of loss of energy over the electrical connection, more energy may be output by a port of the power bank (i.e., an output port to the electrical connection, e.g., port 212 from FIG. 2) than is received by a port of the rechargeable device (i.e., the input port from the electrical connection, e.g., port 214 from FIG. 2). Some electrical connections are inherently more efficient than others. For example, wired USB connections may generally be 80%-90% efficient, whereas wireless charging connections may generally be 40%-60% efficient. Similarly to as observed in the power bank circuitry and rechargeable device circuitry, the electrical connection may become less efficient as the value of the current transferred over the electrical connection decreases.

Fourth, state of health of the power bank battery and/or the rechargeable device battery may influence efficiency losses. As an example, as a battery ages, internal resistance builds up in the battery and thus, an increasing amount of the power bank battery output and/or the rechargeable device battery input is lost as heat.

It should be appreciated that amount of efficiency loss is dependent upon temperature. Generally, battery capacity increases as the temperature rises. That said, after a threshold temperature (~45° C.), additional charge is lost to heat due to a rise in internal resistance associated with battery degradation causing the charging capacity to generally decrease. Accordingly, the power bank MCU and/or the remote server may apply a temperature correction factor based upon a sensed temperature value to adjust one or more of the efficiency measurements.

Based upon at least these factors, the number of potential rechargings of the rechargeable device via the power bank may differ from the user's expectation (for example, instead of a fully charged 12000 mAh power bank providing four full rechargings to a 3000 mAh smartphone battery, the power bank may only provide two-and-a-half rechargings). Furthermore, the state of health of the power bank battery and/or the rechargeable device battery may further affect the number of potential rechargings, due to change in actual capacity. If the power bank has lost capacity (e.g., the actual capacity is significantly less than a 12000 mAh nominal capacity), the power bank may provide fewer rechargings than the user expects. Conversely, if the rechargeable device battery has lost capacity (e.g., the actual capacity is significantly less than the 3000 mAh nominal capacity) whereas the power bank battery has not lost capacity, the number of potential rechargings may increase, since each recharging of the rechargeable device battery requires less charge or energy from the power bank (unless the battery's internal resistance is such that heat loss outweighs the reduction to capacity).

Figure 3:
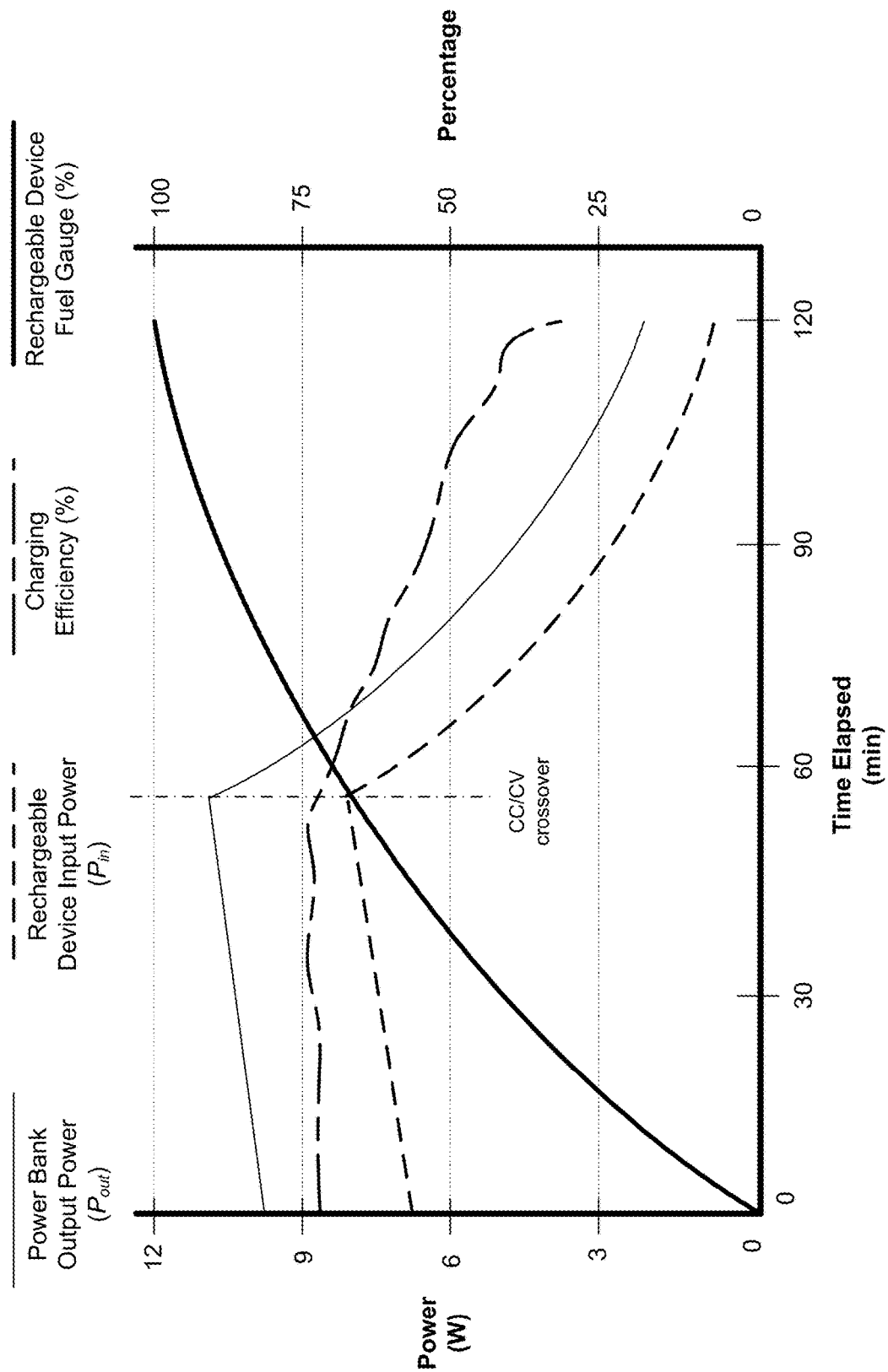
FIG. 3 illustrates an example chart associated with charging efficiency while charging a rechargeable device via a power bank, in accordance with one aspect of the present disclosure.

FIG. 3 illustrates charging efficiency over an example charging session for recharging a smartphone via a power bank via a USB connection. The example charging session takes place over a continuous time interval having a duration of approximately 120 minutes, at the end of which the smartphone battery reaches 100% fuel gauge. The example charging session uses a constant-current constant-voltage (CC/CV) charging protocol and, as can be observed from FIG. 3, the charging efficiency between the power bank battery and the smartphone battery generally decreases over the course of the charging session.

As way of background, CC/CV charging consists of two phases, specifically a first "Constant Current" (CC) phase and a second "Constant Voltage" (CV) phase. During the first CC phase, the power bank battery supplies an outflowing electric current of generally steady amount (e.g., 2.5 A), and the smartphone receives an inflowing electric current of a generally steady amount (e.g., nominally 2.5 A, but potentially less due to efficiency loss). During the CC phase, the smartphone battery voltage increases from its minimum voltage (e.g., 3V at 0% fuel gauge) to its maximum voltage (4.2V, which may be achieved at 50% fuel gauge, 60%, 70%, or another value). Meanwhile, voltage of the power bank battery may eventually decrease from its maximum rated voltage (e.g., 4.2V) toward its minimum rated voltage (e.g., 3V).

When the smartphone battery reaches its maximum voltage, crossover to the second CV phase occurs ("CC/CV crossover"). In the CV phase, the maximum voltage of the smartphone battery is maintained (i.e., constant or near-constant) while the outflowing current from the power bank battery (and in turn, inflowing current to the smartphone battery) decreases from an initial value (e.g., 2.5 A) toward 0 A. When the measured outflowing current (or the measured inflowing current) is below a predetermined threshold (e.g., 0.05 A), it is determined that the smartphone is at or near 100% fuel gauge, and recharging of the smartphone terminates.

As is shown in FIG. 3, charging efficiency is not 100%. Even at the beginning of the charging session, the efficiency is only about 75%, where efficiency loss may be influenced by the power bank circuitry (e.g., power bank voltage regulator), smartphone circuitry (e.g., smartphone voltage regulator), USB connection, state of health of the smartphone battery, and/or state of health of the power bank battery. Generally, efficiency decreases slightly over time as during the CC phase, and larger efficiency losses occur after CC/CV crossover (e.g., due to continued losses at voltage regulators due to further changes to battery voltages, as well as decrease to outflowing/inflowing electric current). Near the end of the charging session, charging efficiency may be 60%, 50%, 40%, or even less. Additional description of techniques for measuring charging efficiency over time are provided in U.S. patent application Ser. No. 16/827,384, filed Mar. 23, 2020, the entirety of the disclosure of which is hereby expressly incorporated herein by reference. While the foregoing explains how charging efficiency of smartphone batteries degrades over time, similar principles explain how the charging efficiency of other types of rechargeable devices degrades as well.

Due to efficiency losses, each recharging of the smartphone effectively spends more of the power bank's stored charge or energy than the user may expect. Because efficiency losses vary over a charging session as well as over the lifetimes of the power bank and the smartphone, it is difficult for the user to estimate just how much charge or energy the power bank will spend in a single recharging of the smartphone. Accordingly, it is difficult for the user to determine, given the fuel gauge of the power bank (e.g., 100%, 50%, 73%, etc.), how many rechargings the power bank can provide to the smartphone before the power bank is depleted.

The methods and apparatus of this disclosure advantageously provide for accurate determination of number of potential rechargings of a rechargeable device (e.g., the smartphone of FIG. 3) using a power bank, specifically by accounting for charging efficiency losses and state of health. Furthermore, by accounting for the significant variations in charging efficiency that occur over a charging session, the methods and apparatus described herein may identify particular practices for charging a rechargeable device that make more efficient use of the power bank's stored charge or energy.

Calculating Number of Potential Rechargings from a Power Bank

Nominally, the number of potential rechargings (N) available from a power bank to a rechargeable device could be determined simply by dividing the charge or energy held by the power bank battery by the capacity of the rechargeable device battery. That is, the typical calculation that the user might perform to calculate N may be expressed as:

$$N = \frac{FG_{pb}}{C_{md}} \text{Full Rechargings} \quad \text{(Eq. 1)}$$

where $FG_{pb}$ is the present fuel gauge of the power bank battery (representing the amount of charge or energy held by the power bank battery), $C_{md}$ is the capacity of the rechargeable device battery, and where each "full recharging" brings the rechargeable device from substantially 0% fuel gauge to substantially 100% fuel gauge.

However, the above calculation is insufficient, and a more accurate calculation of N should take into account efficiency losses that occur during each recharging. Two charging efficiency coefficients (or "factors") $E_1$ and $E_2$ are introduced to account for efficiency losses associated with the power bank and the mobile computing device, respectively.

The first charging efficiency factor $E_1$ may represent a ratio of the power output of the power bank battery (e.g., power output from an output terminal of the power bank battery) to the power output of the power bank (e.g., power output by a port of the power bank to the electrical connection). Accordingly, $E_1$ is a value between 0 and 1.0 (or 0% and 100%). $E_1$ varies as a function of the fuel gauge of the power bank battery. More particularly, $E_1$ typically decreases as the power bank battery fuel gauge decreases (and hence, when power output of the power bank decreases). Values of $E_1$ as a function of the power bank fuel gauge may be stored in a look-up table, which in some embodiments may be stored in non-transitory memory of the rechargeable device (e.g., via instructions at a dedicated power bank application at the rechargeable device device) or at a remote server communicatively coupled to the power bank device and/or the rechargeable device. A lookup table for $E_1$ may be unique to a particular power bank model, and thus, a rechargeable device and/or a remote server may reference a particular $E_1$ lookup table based upon identification of the particular power bank model being used to recharge the rechargeable device.

The second charging efficiency factor $E_2$ may represent a ratio of the power input to the rechargeable device battery (e.g., power input to an input terminal of the rechargeable device battery) compared to the power input to the rechargeable device (e.g., power input to a port of the rechargeable device via the electrical connection). Accordingly, $E_2$ is a value between 0 and 1.0 (or 0% and 100%). $E_2$ varies based upon the fuel gauge of the rechargeable device battery. Values of $E_2$ as a function of the rechargeable device battery fuel gauge may be stored in a second look-up table, which in some embodiments may be stored in non-transitory memory of the rechargeable device (e.g., via instructions at a dedicated power bank application executing at the rechargeable device) or at a remote server communicatively coupled to the power bank device and/or the rechargeable device. A lookup table for $E_2$ may be unique to a particular rechargeable device model. That is, different rechargeable device models may be associated with different lookup tables for $E_2$.

In some embodiments, rather than obtaining the values $E_1$ and $E_2$ from their respective lookup tables, the power bank MCU and/or remote server may instead receive a signal that indicates a measured power output efficiency of the power bank and/or a measured power input efficiency of the rechargeable device. In these embodiments, the respective charging efficiencies may be a dynamic charging efficiency determined in accordance with the dynamic charging efficiency techniques disclosed in U.S. patent application Ser. No. 17/198,967, filed Mar. 11, 2021, the entirety of the disclosure of which is hereby expressly incorporated herein by reference. Accordingly, the values of $E_1$ and $E_2$ may correspond to the received indications of measured power output efficiency and measured power input efficiency, respectively. It should be appreciated that directly measuring the charging efficiency factors may provide a more accurate determination of the actual charging efficiency factor due to the ability to account for dynamic loading conditions. On the other hand, the disclosed lookup table techniques provide the ability to estimate the charging efficiency factor when some of the underlying measurements cannot be performed (e.g., the rechargeable device does not provide an interface via which the measurements can be obtained).

As described the above, the values $E_1$ and $E_2$ vary depending upon temperature. Accordingly, the power bank MCU and/or remote server may apply a temperature correction factor to the $E_1$ and $E_2$. values after obtaining $E_1$ and $E_2$ from their respective lookup tables. Accordingly, a memory of the power bank device and/or the remote server may store an additional lookup table that associates temperature levels (or ranges of temperature levels) with a particular temperature correction factor to apply to $E_1$ and $E_2$. The temperature correction factor may be a value by which $E_1$ and $E_2$ is multiplied (e.g., a value between 0.0 and 2.0) to account for the measured/observed temperature. If the temperature is below a threshold value (e.g., −20° C. or 15° C.) it may be unsafe to operate the power bank device. Accordingly, the temperature correction lookup table may associate these temperatures with a temperature correction value of 0 to indicate that the rechargeable device cannot currently be recharged. In some embodiments, the memory of the power bank and/or the remote server stores a plurality of temperature correction lookup tables respectively corresponding to different battery types. Accordingly, in these embodiments, the power bank MCU and/or the remote server may obtain a temperature value from the temperature sensor of the power bank device to obtain a temperature correction value from the appropriate lookup table to apply to $E_1$ and $E_2$.

The number of potential rechargings N as described herein may also account for a "partial recharging" that charges the rechargeable device from its present fuel gauge $FG_{md}$ (e.g., 1%, 15%, 30%, 65%, 92%, etc.) to 100%. That is, the number of potential rechargings N may include the first partial recharging of the rechargeable device from $FG_{md}$ to 100% and one or more subsequent full rechargings of the rechargeable device from 0% to 100%. The amount of charge or energy necessary to perform the partial recharging is calculated as the difference between $FG_{md}$ and the capacity of the rechargeable device $C_{md}$ (if $FG_{md}$ is substantially 0% or 100%, consideration of the partial charging is effectively obviated, since the first recharging among N is effectively a full recharging). Accordingly, an equation used by methods and apparatus herein to determine N may be expressed as:

$$N = \frac{FG_{pb}E_1E_2 - (C_{md}FG_{md})}{C_{md}} \text{Full Recharging(s)} + 1 \text{ Partial Recharging} \quad \text{(Eq. 2)}$$

Preferably, $C_{md}$ corresponds to the actual capacity of the rechargeable device battery and $FG_{pb}$ is determined based upon the actual capacity of the power bank battery (i.e., $FG_{pb}$ is an amount of charge or energy corresponding to the present fuel gauge percentage multiplied by the actual capacity, rather than the nominal capacity). Actual capacity of a battery (e.g., the rechargeable device battery or the power bank battery) may be determined by (1) measuring an amount of outflowing charge (or energy) from the battery over a time interval during which the battery drains from substantially 100% to substantially 0% fuel gauge, and/or (2) measuring amount of inflowing charge or energy to the battery over a time interval during which the battery charges from substantially 0% to substantially 100% fuel gauge. Additional description of techniques for measuring actual capacity of a battery are provided in U.S. patent application Ser. No. 16/827,459, filed Mar. 23, 2020, the entirety of the disclosure of which is hereby expressly incorporated herein by reference. In some alternative embodiments, $C_{md}$ and/or $FG_{pb}$ may use nominal capacities of the rechargeable device and the power bank, respectively (rather than actual capacities, e.g., if measurements of actual capacities are not available).

In embodiments described herein, the rechargeable device and/or the remote server may determine N each time the rechargeable device is electrically connected to the power bank (e.g., each time the mobile computing device is plugged into the power bank via a USB cable, or each time a wireless charging connection is initiated between the rechargeable device and the power bank), or more particularly, each time charging of the rechargeable device is initiated. The rechargeable device and/or remote server determines its own fuel gauge, and receives an indication of the power bank battery fuel gauge from the power bank (e.g., via wireless RF communications, or via a wired communicative connection). The rechargeable device and/or remote server references a first $E_1$ lookup table to determine a value of $E_1$ based upon the power bank fuel gauge, and references a second $E_2$ lookup table to determine a value of $E_2$ based upon the rechargeable device fuel gauge. The rechargeable device and/or remote server determines the capacity of the rechargeable device battery, for example by measuring actual capacity or by accessing a previous measurement of the actual capacity. The rechargeable device may determine N based at least upon the capacity of the rechargeable device battery, $E_1$, $E_2$, and the respective fuel gauges of the power bank battery and rechargeable device battery. To facilitate display of N to the rechargeable device user by one or more graphical user interfaces, N may be rounded to a nearest integer (e.g., rounded to the nearest lower integer, or rounded down or up to the closest integer).

In some embodiments, Equation 2 as shown above further includes $FG_{pb}$ being multiplied by a third charging efficiency factor $E_3$, specifically reflecting efficiency loss from the electrical connection. In some instances, the value of $E_3$ may be constant if efficiency loss over the electrical connection is constant (e.g., always 5%, regardless of the rechargeable device fuel gauge, the power bank fuel gauge, output/input voltage, current, etc.). In some embodiments, $E_3$ varies as a function of the power bank battery fuel gauge and/or the rechargeable device fuel gauge, and a third lookup table (e.g., stored via instructions at the mobile computing device) may store values $E_3$ for corresponding power bank battery fuel gauge and/or rechargeable device fuel gauge values. Alternatively, the efficiency factors for the power bank and the rechargeable device ($E_1$ and $E_2$) may account for expected efficiency losses over the electrical connection (e.g., $E_1$ accounts for constant efficiency loss from the electrical connection.

In some embodiments, at least some of the calculations described herein for calculating the number of potential rechargings N may be performed by the power bank instead of the rechargeable device and/or remote server. For example, the power bank may receive indications of the actual capacity and the fuel gauge of the rechargeable device battery (e.g., via wireless RF communications). The power bank may access lookup tables to determine $E_1$, $E_2$, and/or $E_3$ (e.g., stored instructions at the power bank include lookup tables), and the power bank may determine N via similar calculations as described herein with respect to the rechargeable device and/or remote server. In embodiments where the rechargeable device does not include a long-range communication transceiver, the power bank device may be configured to relay any indications received from the rechargeable device to the remote server.

As described above, the remote server may store the user profile 138 associated with a user of the power bank device. Accordingly, as the power bank device recharges the rechargeable device, the power bank device and/or the rechargeable device may transmit an indication of one or more values related to the above-described calculations to determine N. For example, as the power bank fuel gauge decrease and/or the rechargeable device fuel gauge increases during the recharging session, the power bank device and/or the rechargeable device may transmit an indication of a their respective current fuel gauge values for storage at the user profile 138. Accordingly, the remote server is able to determine the current $E_1$ and/or $E_2$ values upon receiving updated fuel gauge indications from the rechargeable device and/or power bank device. In some embodiments, in addition to calculating the N for the rechargeable device currently being recharged by the power bank device, the remote server may also calculate the value N for other devices as the $E_1$ value changes during the current charging session.

In embodiments where the rechargeable device is an industrial device configured to perform a particular function (e.g., an automatic paper towel dispenser, an automatic toiler flusher, an automatic door lock, etc.) the remote server may additionally determine a number of times the rechargeable device can activate the particular function. To this end, the manufacturer of the rechargeable device may publish information indicating an amount of power consumed each time the rechargeable device performs the particular function $P_{act}$. The remote server may compile this information for a plurality of rechargeable devices into a look up table.

In some embodiments, the number of times the rechargeable device can activate the particular function is based upon the current capacity of the rechargeable device battery. For example, the remote server may multiply the fuel gauge indication of rechargeable device by the capacity of the rechargeable device to determine an amount of power stored in the rechargeable device battery. The remote server may then divide the amount of power stored in the rechargeable device battery by the $P_{act}$ value for the rechargeable device stored in the look up table to determine the total number of the particular function of the rechargeable device can be activated at the current charge level for the rechargeable device.

Additionally or alternatively, the remote server may determine the number of times the rechargeable device can activate the particular function based upon the current capacity of the rechargeable device battery and the number of potential rechargings provided by the power bank device. To this end, the remote server may convert the number of charges remaining N into a number of times the rechargeable device can be activated via the number of potential rechargings and add that value to the number or times the rechargeable device can be activated at the current charge level for the rechargeable device. Accordingly, the server may multiply the number of recharges N by the capacity of the rechargeable device $C_{md}$ to determine the total amount of power available via the number of potential rechargings. The remote server may then divide this amount of power by the $P_{act}$ value for the rechargeable device stored in the look up table to determine the total number of the particular function of the rechargeable device may be activated via the number of potential rechargings N. The remote server may then update the user profile 138 to include the determined number of activations for the rechargeable device based on the current charge level of the rechargeable device and/or the potential number of rechargings N.

Selection of Recharging Ranges for Efficient Use of Power Banks

Although Equation 2 as shown above provides the number of full rechargings of the mobile computing device from 0% to 100% (plus one partial recharging from the present fuel gauge to 100%), a user may instead wish to determine how many times the power bank can provide a particular partial recharging to the rechargeable device, for example a recharging from 0% to 50%, from 10% to 70%, from 40% to 80%, or from another "start fuel gauge" ($FG_1$) to an "end fuel gauge" ($FG_2$) defining a "recharging range."

In these embodiments, a modified calculation of N can be provided, where N includes a first partial recharging that brings the rechargeable device from its present fuel gauge $FG_{md}$ to $FG_2$, and each subsequent recharging is a partial recharging that charges the rechargeable device from $FG_1$ to $FG_2$. Accordingly, a modified equation for determining N in these embodiments can be expressed as:

$$N = \frac{FG_{pb}E_1E_2 - (FG_2 - FG_{md})}{(FG_2 - FG_1)} \text{Partial Recharging(s)} \quad \text{(Eq. 3)}$$
$$+ 1 \text{ Partial Recharging}$$

Values for $FG_1$ and $FG_2$ may be obtained by the rechargeable device, for example, via instructions at a personal electronic device and/or a remote server (e.g., via a dedicated power bank application executing at the mobile computing device and/or remote server, based upon pre-programmed values and/or based upon user input of values for $FG_1$ and $FG_2$). As with Equation 2, values of $E_1$ and $E_2$ may be obtained by a personal electronic device and/or the remote server via lookup tables based upon the power bank battery fuel gauge and rechargeable device battery fuel gauge and, in some embodiments, an additional efficiency factor may be utilized and/or otherwise included to reflect efficiency loss specific to the electrical connection.

N, according to Equation 3, will vary based upon the difference between $FG_1$ and $FG_2$ (i.e., the amount of charge or energy needing to be received by the rechargeable device to charge from $FG_1$ to $FG_2$). Furthermore, because of the differences in charging efficiency at different rechargeable device fuel gauges, N will vary based upon $FG_1$ and $FG_2$, even irrespective of the difference between $FG_1$ and $FG_2$. (e.g., N may be greater when both $FG_1$ and $FG_2$ are lower, as will be understood from FIG. 4). As with Equation 2, N may be rounded down to the nearest integer (or in some instances, rounded down or up to the nearest integer) to produce a value for N that can be more conveniently displayed for the user.

Figure 4:
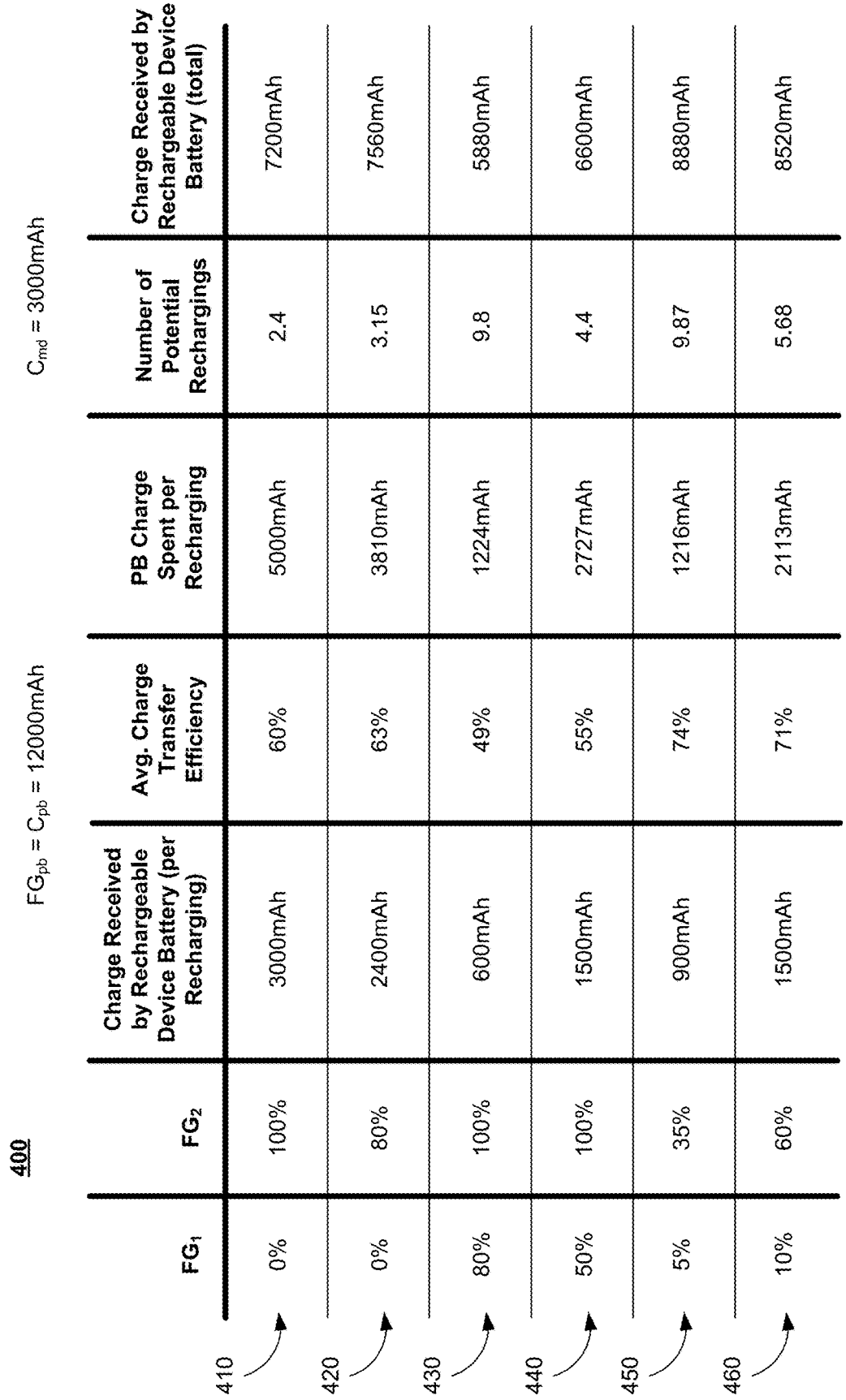
FIG. 4 illustrates a table showing example charging metrics, in accordance with one aspect of the present disclosure.

FIG. 4 illustrates a table 400 showing example charging metrics associated with charging scenarios defined by respective recharging ranges (i.e., a range defined by respective fuel gauge pairs $FG_1$ and $FG_2$), in accordance with some embodiments. Particularly, the table 400 shows charging metrics related to number of potential rechargings of a rechargeable device via a power bank for each $FG_1$ and $FG_2$, based upon expected charging efficiency rechargings in each range (e.g., based upon past monitoring of charging efficiency between the power bank and the rechargeable device, and/or monitoring of similar combinations of power banks and rechargeable devices). By considering the number of potential rechargings in combination with expected efficiency of a recharging range, particular recharging ranges for the rechargeable device are advantageously identified that make more efficient use of the power bank, compared to typical user behaviors.

In the table 400, it is assumed that the power bank has an actual capacity ($C_{pb}$) of 12000 mAh, and is fully charged (i.e., $FG_{pb}$ is identical to $C_{pb}$ at the outset). The actual capacity of the rechargeable device ($C_{md}$) is assumed to be 3000 mAh. Additionally, for the sake of simplicity, consideration of the present rechargeable device fuel gauge $FG_{md}$ is omitted (thus, the "initial partial recharging" is obviated). Still additionally, for the sake of simplicity, "charging efficiency" with reference to the table 400 will refer to an average ratio of charge received by the rechargeable device battery to charge lost by the power bank in a given charging scenario (though other representations of efficiency are envisioned for calculations of number of rechargings, e.g., $E_1$ and $E_2$ as described above). Finally, it should be understood that the values shown in the table 400 are exemplary only, and other values are possible (e.g., different capacities, efficiencies, etc.), in various combinations of power banks, rechargeable devices, electrical connections, etc.

In a first scenario 410 (i.e., first row of the table 400), each recharging of the rechargeable device is a full recharging from 0% to 100% fuel gauge. Accordingly, each recharging provides 3000 mAh charge to the rechargeable device battery. Referencing FIG. 3, it is estimated that an average (mean) charging efficiency over the 0% to 100% recharging range is approximately 60%. That is, only 60% of the charge lost by the power bank battery is gained by the rechargeable device battery (e.g., due to efficiency losses from power bank circuitry, rechargeable device circuitry, the electrical connection, and/or battery state of health). Thus, each recharging effectively consumes or "spends" 5000 mAh charge from the power bank battery. By dividing the power bank fuel gauge $FG_{pb}$ by the effective charge spent by the power bank per recharging, it is determined that 2.4 rechargings can be provided by the power bank to the rechargeable device before the power bank battery is depleted (with each recharging bringing the mobile computing device from 0% to 100% fuel gauge). By multiplying the number of rechargings by the amount of charge received by the rechargeable device per recharging, it is determined that the rechargeable device effectively receives only 7200 mAh of the power bank's 12000 mAh charge (the rest of the power bank's charge is lost, for example as heat energy).

In a second scenario 420 (i.e., second row of the table 400), the end fuel gauge $FG_2$ is adjusted to avoid the inefficient charging that typically occurs over charging of the last 20% of the rechargeable device battery. That is, each recharging starts at 0% rechargeable device fuel gauge and terminates upon detection of the rechargeable device reaching 80% fuel gauge. The recharging range in the scenario 420 is smaller than in the previous scenario 410, but uses the power bank more efficiently (with an estimated 63% average charging efficiency). As a result of the smaller charging range and higher efficiency, a greater number of partial rechargings is possible in the scenario 420. Using a smaller and more efficient recharging range a greater number of times, the rechargings according to the scenario 420 collectively allow for the rechargeable device to receive a greater amount of the power bank's total charge (i.e., 7560 mAh from the power bank's 12000 mAh capacity, compared to only 7200 mAh in the previous scenario 410).

A third scenario 430 demonstrates a much less efficient recharging range, from 80% to 100% fuel gauge. Each recharging in the scenario 430 is only 49% efficient on average. A total of 9.8 partial rechargings can be performed to fully drain the power bank battery, but because each recharging occurs during what is observed to be a particularly inefficient portion of charging (see FIG. 3), the rechargeable device receives in total much less of the power bank's stored charge, compared to the scenarios 410 and 420. Similarly, in a fourth scenario 440 showing a recharging range from 50% to 100%, average charging efficiency is slightly improved from the previous scenario 530 (due to incorporation of the 50%-80% range, which is more efficient than 80%-100%), but the rechargeable device still only receives 6600 mAh over 4.4 partial rechargings. Thus, use of the power bank according to the scenario 440 may still be considered less efficient than by the scenarios 410 and 420.

Often, a user charges his or her rechargeable device by allowing the power bank to "top off" the mobile computing device battery to 100% fuel gauge, for example according to the scenarios 430 or 440 above. Also, the user often does not wait for the rechargeable device to fully drain (to 0% or near 0% fuel gauge), before connecting the power bank. These practices are often reinforced through habit, as most users are typically less concerned with energy efficiency when charging their rechargeable device via an AC wall outlet, or via another source of effectively unlimited charge. However, as observed from the scenarios described herein, these practices use the power bank inefficiently. It would be advantageous to identify ranges for recharging that make more efficient use of the power bank, to thereby provide more of the power bank's stored charge or energy to the mobile computing device.

Still referring to the table 400 of FIG. 4, in a fifth scenario 450, a recharging range from 5% to 35% is used, with an average charging efficiency of 74%. Because this recharging range is typically more efficient (e.g., as compared to charging beyond 80%), a total of 8880 mAh of the power bank's 12000 mAh capacity may be provided to the rechargeable device battery over 9.87 partial rechargings. However, such a small recharging range (and particularly, one that ends at such a low fuel gauge) may be considered inconvenient. As an alternative to such a small recharging range, a sixth scenario 460 provides a larger recharging range that is almost as efficient on average as that of the previous scenario 450. The scenario 460 provides almost as much as the power bank's total charge to the rechargeable device as in the scenario 450, but provides convenience in that recharging (1) does not occur as frequently as in the scenario 450, and (2) does not require that the rechargeable device battery drains as near to 0% as in the scenario 450.

In view of the charging metrics shown in the table 400 in FIG. 4, users may take into account various considerations when deciding upon practices for using a power bank. Some users may prefer to maximize the size of recharging ranges and always charge their rechargeable device(s) to 100% (e.g., from 0%, 20%, 50%, or whatever present fuel gauge), regardless of efficiency. Other users may prefer large recharging ranges, but may be willing to exclude the least efficient portions of charging (e.g., 60% to 100%, 80% to 100%, 90% to 100%, etc., as in scenarios 420 or 460) to conserve and more efficiently use at least some power bank charge, with minimal inconvenience. Still other users may prefer to maximize the effective amount of charge that the power bank can provide to the rechargeable device by using a recharging range that achieves high efficiency (e.g., as in scenario 450), regardless of how small the recharging range is and how often recharging must start and end.

While the FIG. 4 set out various scenarios for recharging a single rechargeable device via a power bank device, alternative scenarios are envisioned whereby the power bank device is used to efficiently recharge two or more rechargeable devices. In these alternative scenarios, the number of rechargings for each rechargeable device may be calculated, as a recharging plan that optimizes the number of potential rechargings across the two or more devices based upon the above-described user preferences.

In some embodiments, a user interface may be presented to a user to select the particular devices included in the recharging plan. For example, a user profile stored at the remote server may include a list of rechargeable devices associated with the user and the user interface may be configured to enable the user to select the two or more rechargeable devices from the list of rechargeable devices. Accordingly, the user is able to generate a recharging plan specific to the power bank and the particular rechargeable devices carried by the user. As one particular example, the recharging plan may present optimal recharging ranges for a personal mobile computing device and a work mobile computing device carried by a user and the corresponding number of potential rechargings associated with each mobile computing device.

In view of these considerations, a personal electronic device application and/or a remote server application as described herein may be configured via instructions to provide recommendations of fuel gauge ranges for recharging rechargeable device(s) via a power bank. Additionally or alternatively, the application may be configured to provide notifications (e.g., push notifications) and/or control charging (i.e., automate initiation and/or termination of charging) based upon a configured recharging range for the rechargeable device(s), the configured recharging range having a start fuel gauge $FG_1$ and an end fuel gauge $FG_2$. As an example, when the rechargeable device drains to $FG_1$, the personal electronic device and/or remote server may (1) provide an indication that the charging should be initiated, and/or (2) if the rechargeable device and the power bank are already electrically connected, automatically initiate charging of the rechargeable device. When the rechargeable device fuel gauge reaches $FG_2$, the personal electronic device and/or remote server may (1) provide a notification indicating that the power bank can be disconnected from the rechargeable device, and/or (2) automatically terminate charging of the rechargeable device. If the power bank and rechargeable device remain electrically connected after charging has been terminated, the application instructions may prevent resumption of charging that might otherwise occur when the rechargeable device drains to 99% fuel gauge, 98%, 95%, etc. (e.g., to prevent resumption of charging until the rechargeable device fuel gauge falls to $FG_1$ or the user instructs for charging to continue).

Example Graphical User Interfaces

FIGS. 5A-5F illustrates example graphical user interfaces that may be displayed at a personal electronic device 510, in accordance with aspects of the present disclosure. The personal electronic device 510 may, for example, be the personal electronic device 121 described with respect to FIG. 1B. As described above, in some scenarios, the personal electronic device 121 may be the mobile computing device 120 described with respect to FIG. 1A, the rechargeable device 120 described with respect to FIGS. 1B and 2, or another suitable personal electronic device. Generally, the graphical user interfaces (GUIs) of FIGS. 5A-5F are associated with charging of a rechargeable device via a power bank (e.g., the power bank 140 described with respect to FIG. 1 or 2). In the illustrated scenarios, the personal electronic device 510 may be the rechargeable device. However, in other scenarios this is not the case. To provide a framework these alternative scenarios, in this section, the term "personal electronic device" refers to the personal electronic device 510 as the device configured to display the user interfaces of FIGS. 5A-5F and the term "rechargeable device" refers to the personal electronic device 510 as the device that is being recharged by the power bank. In these alternate scenarios, the fuel gauge of the rechargeable device is generally not the same as the fuel gauge of the personal electronic device 510.

In some embodiments, the graphical user interfaces of FIGS. 5A-5F are displayed via a dedicated power bank application executing at the personal electronic device 510 (e.g., power bank application 156 of FIG. 1). In alternative embodiments, the equivalent graphical user interfaces may be displayed via a browser application executing on the personal electronic device 510. In these embodiments, the browser application may communicatively couple the personal electronic device 510 with a remote server (e.g., the remote server 130 of FIG. 1B).

Figure 5A:
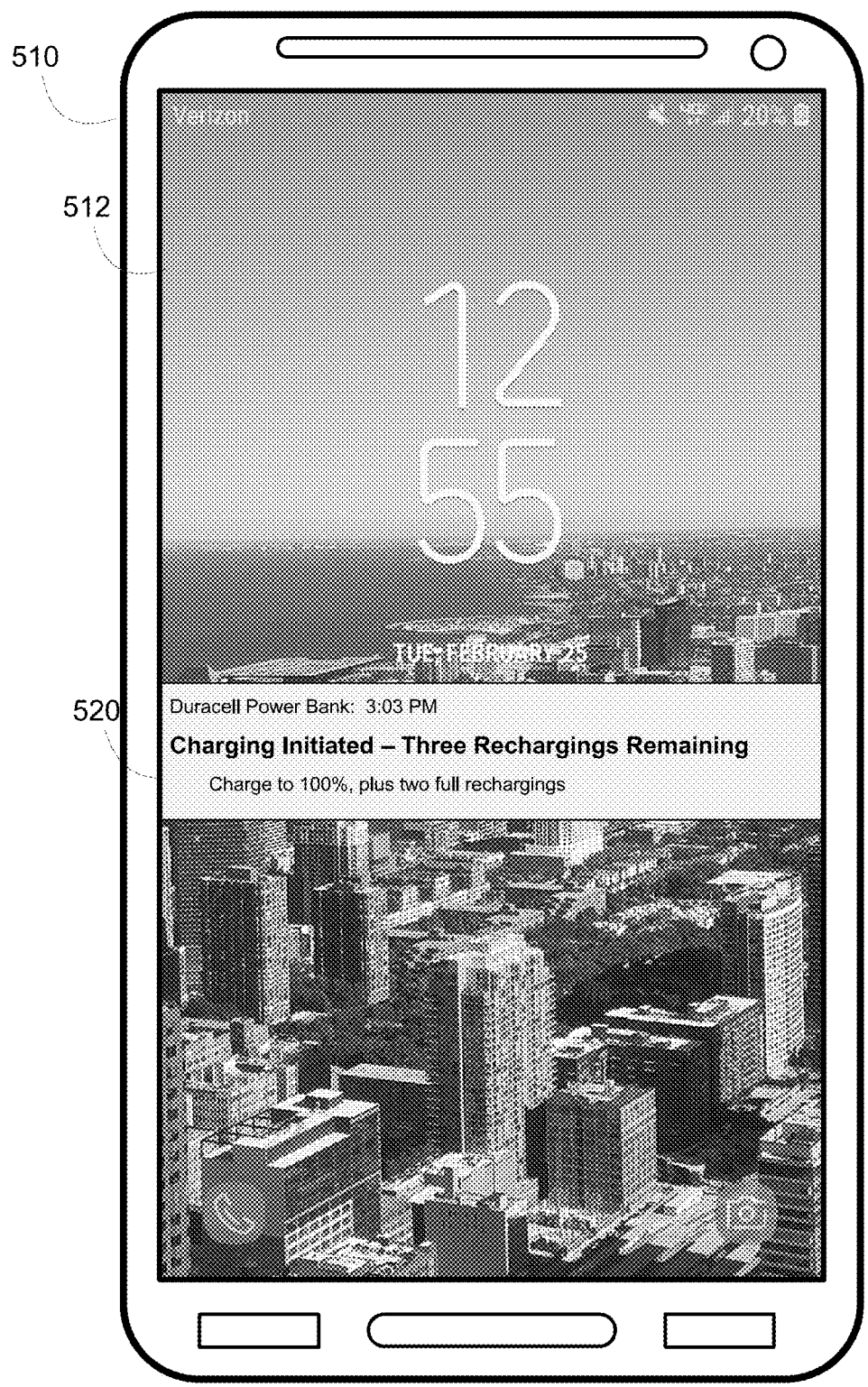
FIGS. 5A-5F illustrate example graphical user interfaces of a personal electronic device, in accordance with aspects of the present disclosure.

FIG. 5A illustrates a screen 512 (e.g., touchscreen display) of the personal electronic device 510, the screen 512 displaying a GUI 520. The GUI 520 indicates initiation of charging of the rechargeable device via the power bank (e.g., via a USB connection, wireless electrical connection, or other suitable electrical connection). When charging is initiated and/or when the rechargeable device is electrically connected to the power bank (e.g., when the user plugs in a USB cable or places the rechargeable device on a wireless charging pad), the personal electronic device 510 and/or remote server may determine the number of potential rechargings (N) for the rechargeable device via the power bank. In this instance, the personal electronic device and/or remote server determines N based upon Equation 2 as described herein (i.e., N includes a partial recharging to 100%, and a number of full rechargings thereafter). N may be rounded down (or in some instances, rounded down or up to the nearest integer) to produce an integer value for N. As shown in FIG. 5A, the personal electronic device 510 and/or the remote server determines that three potential rechargings are possible, including a first partial recharging of the rechargeable device from its present fuel gauge (e.g., 20%) to 100%, and two full rechargings of the rechargeable device from 0% to 100% (some leftover charge from the power bank may still be available thereafter).

Figure 5B:
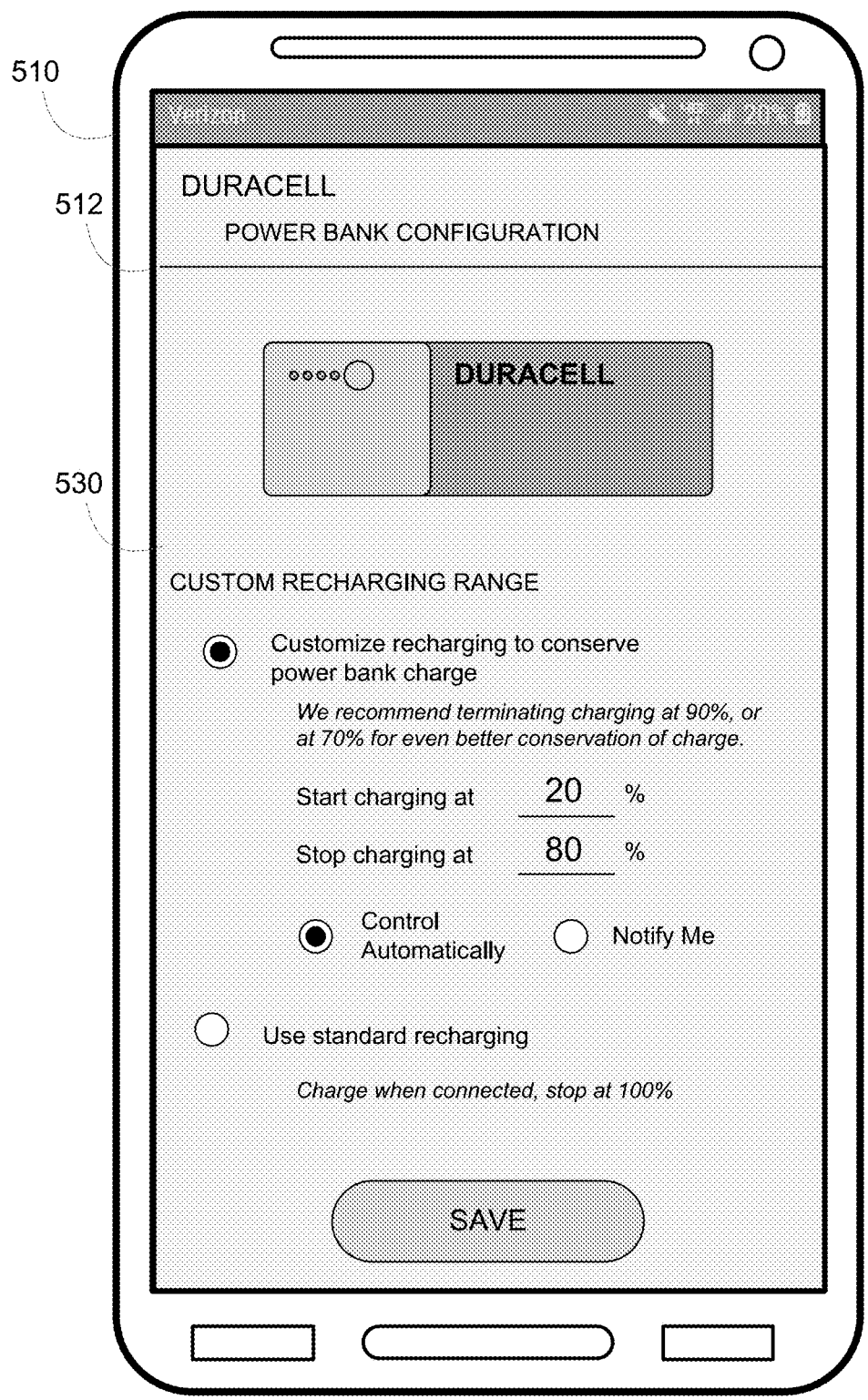

FIG. 5B illustrates the screen 512 of the mobile computing device 510, the screen 512 displaying a second GUI 530. The GUI 530 allows the user of the personal electronic device 510 to configure a "custom recharging range" (e.g., any recharging range described herein) for rechargeable device(s) included in a user profile maintained at the remote server. In this instance, a user of the personal electronic device 510 configures rechargings to begin at 20% rechargeable device fuel gauge and end at 80% fuel gauge. The GUI 530 allows the user to indicate whether the personal electronic device 510 and/or remote server should control charging automatically based upon the defined recharging range (e.g., automatically initiate/terminate charging, or whether the personal electronic device 510 should instead display notifications that allow the user to control charging (e.g., by unplugging a USB cable, by removing the rechargeable device from a wireless charging pad, or by interacting with GUI controls at the personal electronic device 510).

Figure 5C:
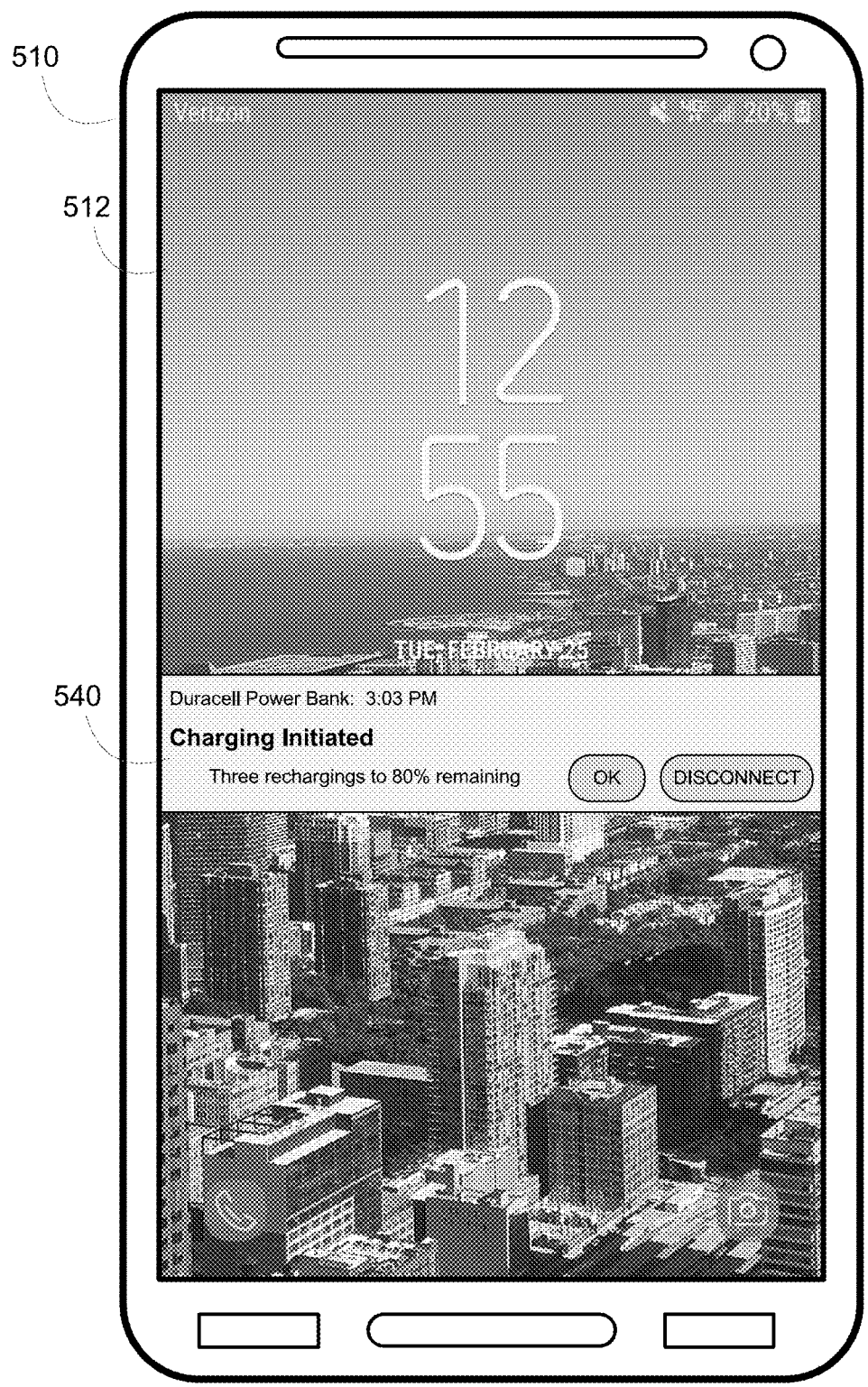

FIG. 5C illustrates the screen 512 of the personal electronic device 510, the screen 512 displaying another GUI 540. In accordance with the configuration from the GUI 530 from FIG. 5B, the GUI 540 indicates that recharging of the rechargeable device via the power bank has been automatically initiated in response to measuring a fuel gauge of 20% (or lower) at the rechargeable device. The GUI 540 indicates that three rechargings of the rechargeable device to 80% (e.g., based upon Equation 3, as described herein). In response to a user interaction to accept the initiation of charging ("OK") the GUI 540 is dismissed. Alternatively, in response to a different user interaction ("DISCONNECT"), the supply of charge to the rechargeable device is interrupted.

Figure 5D:
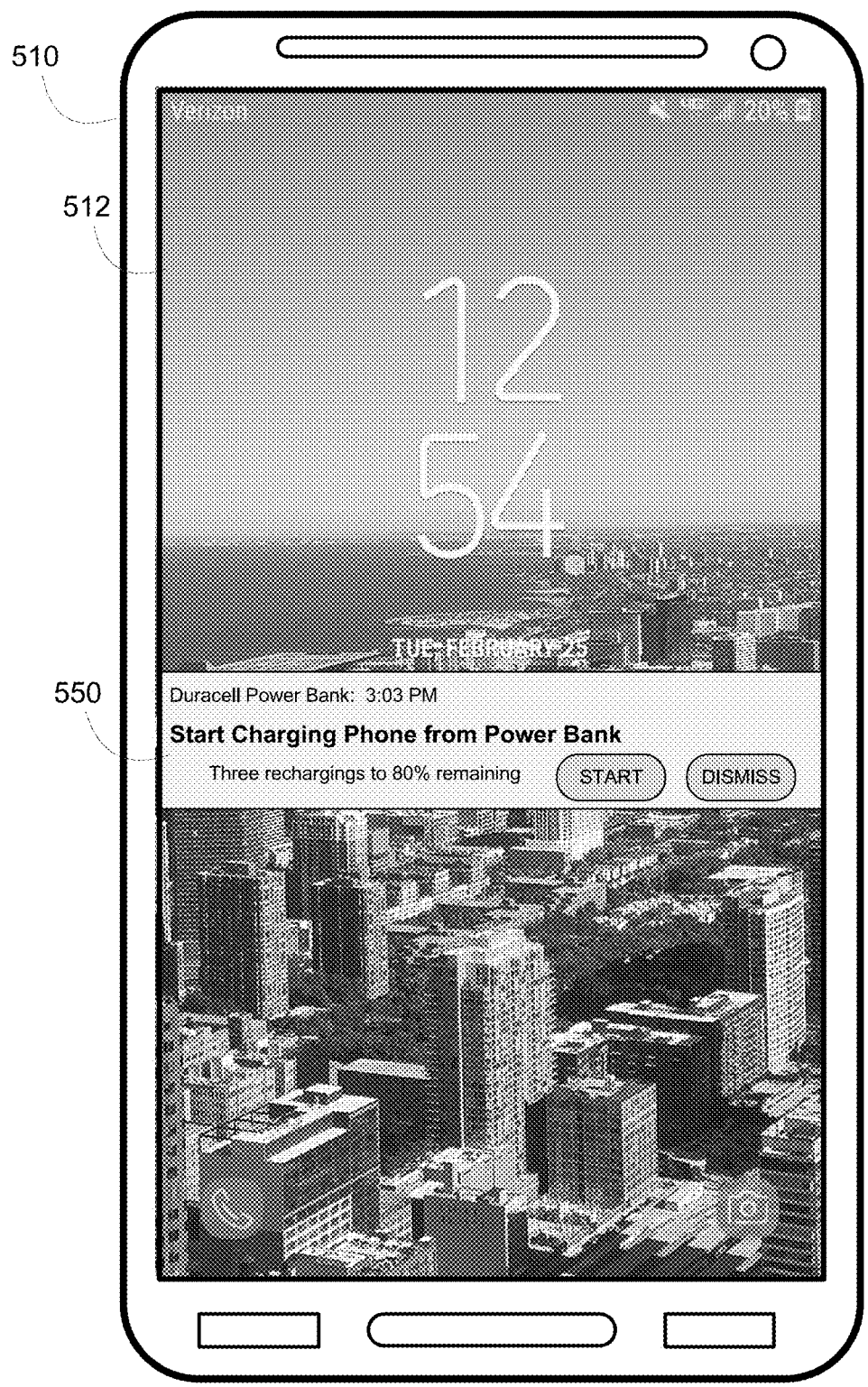

FIG. 5D illustrates the screen 512 displaying still another GUI 550. The GUI 550 may be displayed, for example, if the user of the personal electronic device 510 selected the "Notify Me" option in the GUI 530, or if the rechargeable device is not electrically connected to the power bank when the fuel gauge falls to 20% or lower. If the rechargeable device is electrically connected to the power bank and charging can begin, a user interaction ("START") may cause initiation of charging of the rechargeable device from the power bank. Alternatively, in response to a different user interaction ("DISMISS"), the GUI 550 is dismissed.

Figure 5E:
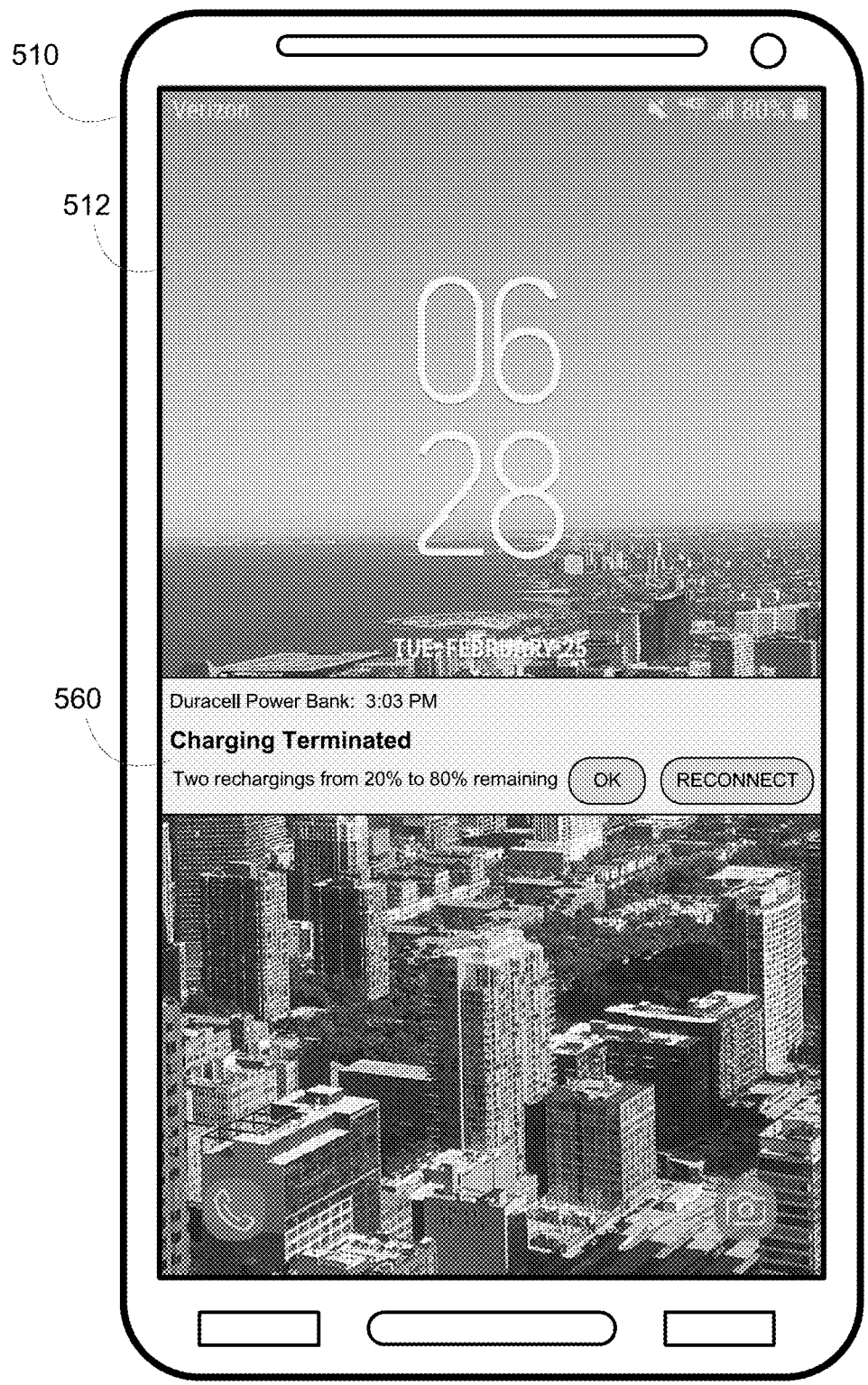

FIG. 5E illustrates the screen 512 displaying another GUI 560. In accordance with the configuration from the GUI 530 from FIG. 5B, the GUI 560 indicates that recharging of the rechargeable device via the power bank has been automatically terminated in response to measuring a fuel gauge of 80% (or higher) at the rechargeable device. The GUI 560 indicates that two additional rechargings of the rechargeable device to 80% are available (e.g., after one of the three rechargings as shown in FIG. 5C having been spent). In response to a user interaction to accept the termination of charging ("OK") the GUI 560 is dismissed. Alternatively, in response to a different user interaction ("RECONNECT"), the supply of charge to the rechargeable device from the power bank resumes.

Figure 5F:
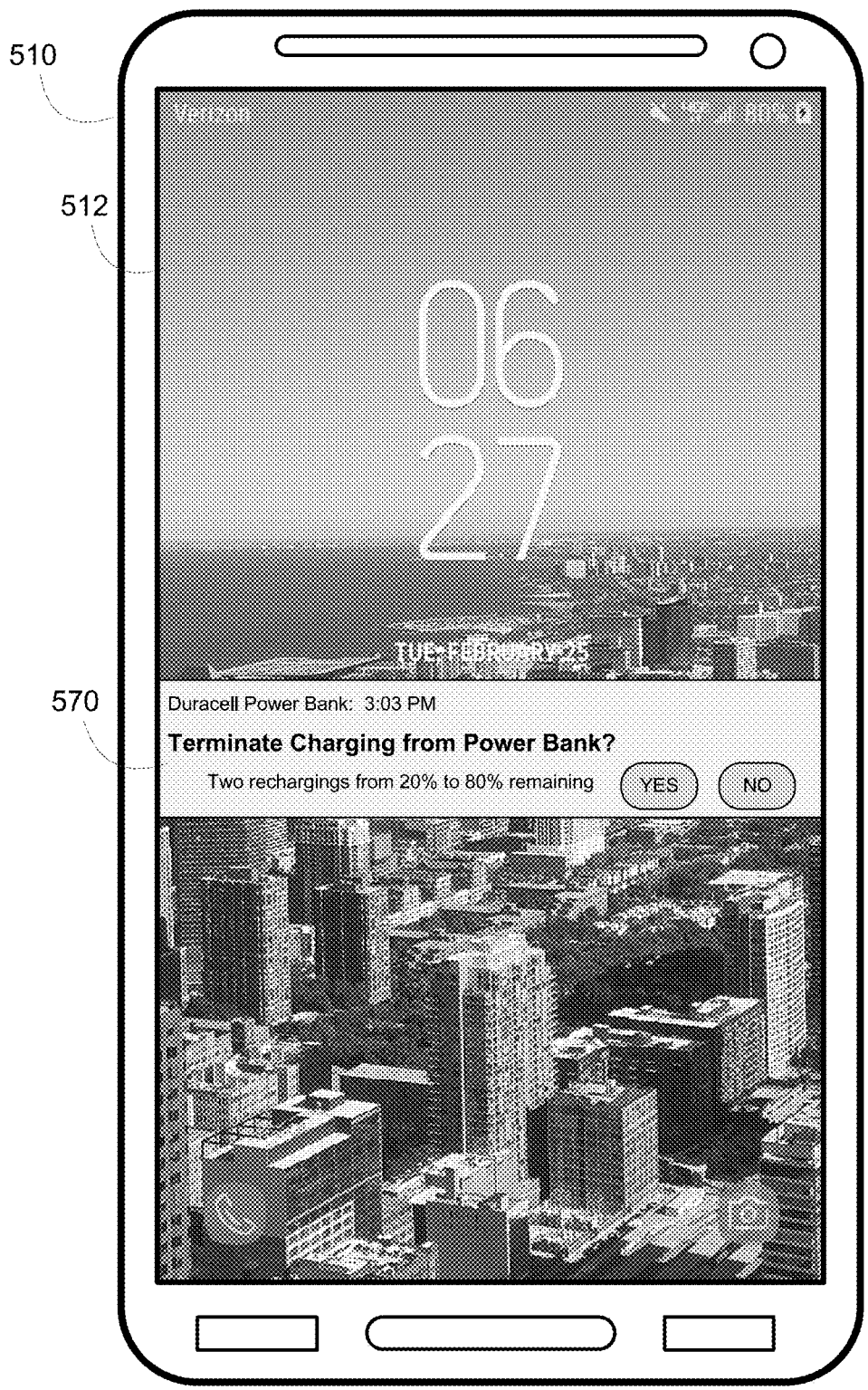

FIG. 5F illustrates the screen 512 displaying yet another GUI 570. The GUI 570 may be displayed, for example, if the user of the personal electronic device 510 selected the "Notify Me" option in the GUI 530. The GUI 570 allows the user to indicate whether to terminate charging. In response to a user interaction ("YES"), charging is terminated. Alternatively, in response to a different user interaction ("NO"), charging continues. As in the GUI 560 of FIG. 5E, the GUI 570 displays the remaining number of potential rechargings of the rechargeable device.

Additional or alternative user interfaces may provide similar information and similar controls to those shown in FIGS. 5A-5F, and/or may provide other charging-related information described herein. In some embodiments, the push notifications of FIGS. 5A and/or 5C-5F may be substituted or supplemented with full-screen displays by the power bank application executing at the personal electronic device 510. Furthermore, user interface techniques may be implemented that use audio input/output via a microphone and/or speaker of the personal electronic device 510, in various embodiments, for example to communicate audio push notifications.

Example Method

Figure 6:
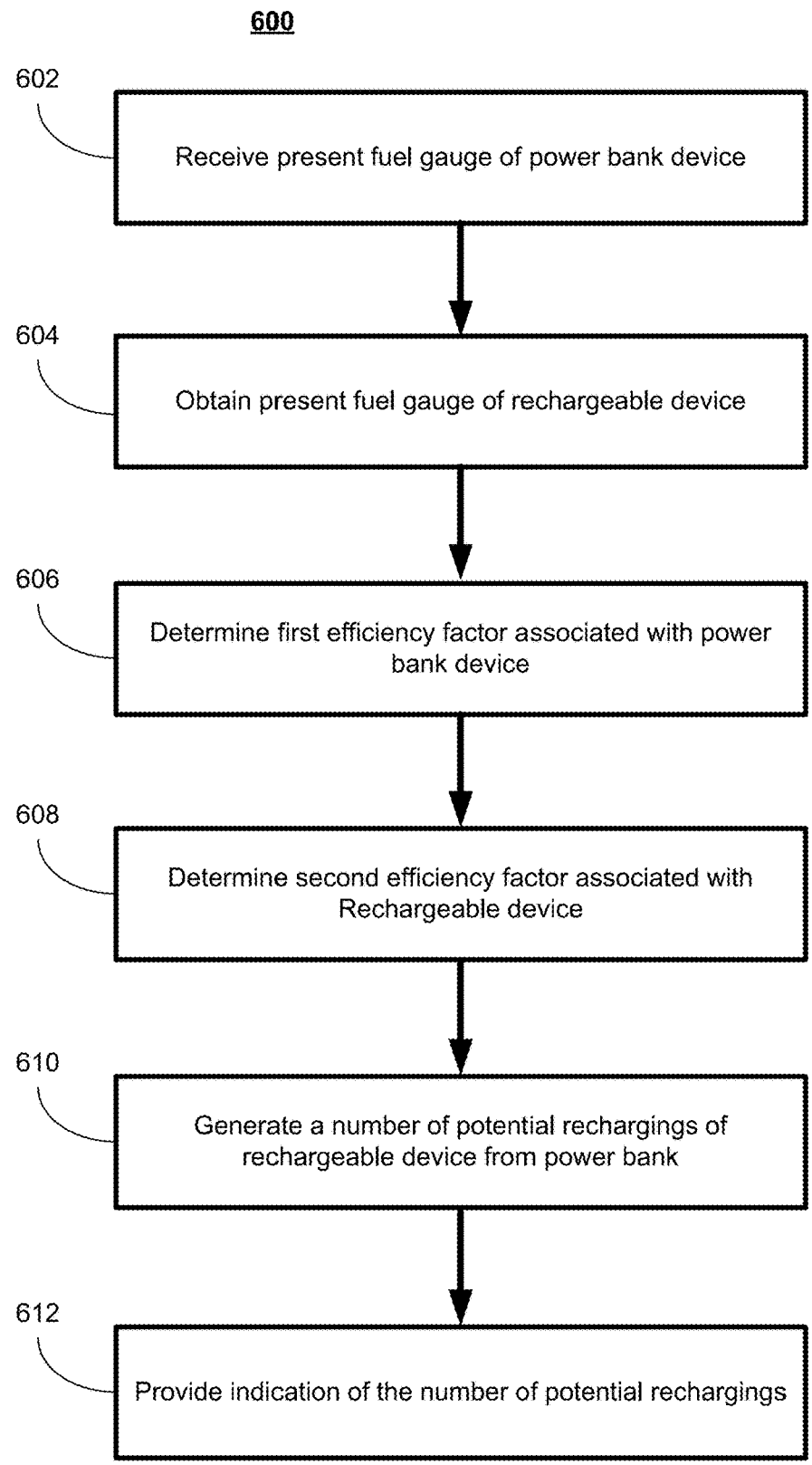
FIG. 6 illustrates an example method associated with a remote server, in accordance with one aspect of the present disclosure.

FIG. 6 depicts a block diagram corresponding to an example method 600 performed by a remote server (e.g., the remote server 130 of FIG. 1B). The method 600 provides for generation and provision of a number of potential rechargings of a rechargeable device battery from a battery of a power bank, via an electrical connection. The rechargeable device may, for example, be the rechargeable computing device 120 and/or mobile computing device 120 described with respect to FIG. 1A and/or another suitable mobile computing device. The power bank may be, for example, the power bank 140 as described with respect to FIG. 1 or 2. The electrical connection may be a wired electrical connection (e.g., USB) or a wireless electrical connection. Actions of the remote server in the method 600 may be performed by the remote server processor (e.g., processor 133 in FIG. 1B) and/or communication module (e.g., communication module 131 in FIG. 1B).

The method 600 includes receiving a present fuel gauge signal indicative of a present fuel gauge of the power bank (602). For example, the remote server may receive a wireless signal from the power bank and/or rechargeable device via the remote server communication module (and/or the transceivers thereof). The fuel gauge of the power bank is a percentage of a capacity of the power bank battery (preferably, of the actual capacity). Capacity of the power bank battery may be expressed in units of electric charge (e.g., mAh) or units of energy (e.g., Wh). Thus, the power bank fuel gauge corresponds to a particular amount of electric charge or energy held by the power bank battery.

As described herein, the remote server may be configured to store a user profile associated with a user of the power bank. Accordingly, the wireless signal received from the power bank may include an identifier associated with the power bank. Using the power bank identifier, the remote server may be configured to identify the user profile and update an indication of the power bank fuel gauge maintained thereat.

The method 600 also includes obtaining a present fuel gauge signal indicative of a present fuel gauge for the rechargeable device (604). The fuel gauge of the rechargeable device is a percentage of a capacity of the rechargeable device battery (preferably, of the actual capacity). Capacity of the rechargeable device battery may be expressed in units of electric charge (e.g., mAh) or units of energy (e.g., Wh). Thus, the rechargeable device fuel gauge corresponds to a particular amount of electric charge or energy held by the rechargeable device battery.

In scenarios where the power bank is being used to recharge the rechargeable device, the fuel gauge signal may be received via the remote server communication module (and/or the transceivers thereof) from the power bank and/or rechargeable device. In these scenarios, the wireless signal that included the power bank present fuel gauge signal may also include the rechargeable device present fuel gauge signal. In another scenario, the rechargeable device is a mobile computing device executing power bank application (e.g., the PB app 156 of FIG. 1A) independent of being recharged by the power bank. In this scenario, the power bank application may cause the mobile computing device to periodically transmit a present fuel gauge signal to the remote server as the mobile computing device batteries depletes over time. In these scenarios, the present fuel gauge signal of the rechargeable device may include an identifier associated with the rechargeable device. Using the rechargeable device identifier, the remote server may be configured to identify the user profile and update an indication of the rechargeable device fuel gauge maintained thereat.

In still another scenario, the present fuel gauge signal of the rechargeable device is obtained from the user profile data. For example, if the power bank is being used to recharge a first rechargeable device, the remote server may obtain a present fuel gauge of a second rechargeable device to determine a change in the number of rechargings of second rechargeable device is view of the usage of the power bank to recharge the first rechargeable device.

The method 600 further includes determining a first charging efficiency factor associated with the power bank battery (606). The remote server may obtain the first charging efficiency factor via a lookup table (e.g., via rechargeable device memory) based upon the received indication of the power bank fuel gauge. The first efficiency factor may, for example, reflect efficiency loss from circuitry of the power bank (e.g., from the voltage regulator) as a function of the power bank battery fuel gauge.

In some embodiments, the remote server may be configured to apply temperature correction factor to the first charging efficiency factor. In these embodiments, the wireless signal that included the power bank present fuel gauge signal may include a temperature value indicative of a temperature sensed by the power bank. Accordingly, the remote server may obtain the temperature correction value via another lookup table and adjust the obtained value from the charging efficiency factor lookup table (e.g., by multiplying the first charging efficiency factor and the temperature correction factor).

The method 600 further includes determining a second charging efficiency factor associated with the rechargeable device battery (608). The remote server may obtain the second efficiency factor via a lookup table (e.g., via remote server memory) based upon the rechargeable device fuel gauge. The second efficiency factor may, for example, reflect efficiency loss from circuitry of the rechargeable device (e.g., from the voltage regulator) as a function of the rechargeable device battery fuel gauge.

In some embodiments, the remote server may be configured to apply temperature correction factor to the second charging efficiency factor. If the rechargeable device is being recharged by the power bank device, the remote server may use a temperature value included in the wireless signal that included the power bank present fuel gauge signal. The remote server may also be configured to receive a temperature value sensed by the rechargeable device. For example the power bank application may be configured to cause the rechargeable device to include a temperature value when reporting the rechargeable device fuel gauge. In scenarios where the rechargeable device is not being recharged by the power bank, the remote server may use the power bank temperature level or a prior temperature level associated with the rechargeable device. Regardless, the remote server may obtain the temperature correction value via another lookup table and adjust the obtained value from the charging efficiency factor lookup table (e.g., by multiplying the second charging efficiency factor and the temperature correction factor). Additional description of techniques for correcting battery measurements in view of a sensed temperature are provided in U.S. patent application Ser. No. 17/198,991, filed Mar. 23, 2020, the entirety of the disclosure of which is hereby expressly incorporated herein by reference.

In some embodiments, rather than obtaining the first and second charging efficiency factors from their respective lookup tables, the remote server may instead be configured to determine first and second charging efficiency factors based upon at least one of (i) a measured power output efficiency of the power bank device and (ii) a measured power input efficiency of the rechargeable device. The remote server may receive an indication of the measured power efficiencies in a signal received from the power bank device and/or the rechargeable device. For example, the measured power output efficiency may be included in the present fuel gauge signal for the power bank device and the measured power input efficiency may be included in the present fuel gauge signal for the rechargeable device. In these embodiments, the power output efficiency may be used as the first charging efficiency factor and the power input efficiency may be used as the second charging efficiency factor. If the received signals only include one of the power output efficiency of the power bank device and power input efficiency of the rechargeable device, the remote server may user the disclosed lookup table techniques to determine the other value.

The method 600 still further includes generating a number of potential rechargings of the rechargeable device from the power bank via the electrical connection (610). Each of the potential rechargings is a charging of the rechargeable device to a desired "end" fuel gauge (e.g., 100%, 90%, 80%, or another appropriate percentage of the rechargeable device battery capacity). The number of potential rechargings is based at least upon the desired fuel gauge, the present fuel gauges of the rechargeable device battery and the power bank battery, and the first and second charging efficiency factors. More particularly, the determining of the number of potential rechargings is based upon Equation 2 and/or Equation 3 as described herein.

In some embodiments, the number of potential rechargings is a total including (1) a first "initial" partial recharging of the mobile computing device battery from its present fuel gauge to the desired fuel gauge and (2) one or more additional rechargings of the rechargeable device battery from substantially zero charge to the desired fuel gauge. In some embodiments, the one or more additional rechargings are full rechargings from substantially 0% to substantially 100% fuel gauge (e.g., as described with respect to Equation 2). Alternatively, in some embodiments, the one or more additional rechargings are rechargings to a different desired fuel gauge (e.g., 60%, 70%, 80%, etc.). In various embodiments, start and/or end fuel gauges for rechargings may be configured by application instructions, e.g., based upon user input as described with respect to FIG. 5B). The remote server may then update the user profile to associate the rechargeable device with the determined number of potential rechargings.

The method 600 further includes providing, to a user interface, an indication of the number of potential rechargings of the rechargeable device (612). In some embodiments, the user interface is presented on the rechargeable device via the power bank application. For example, the application may detect an indication to present the user interface and transmit a request to obtain the number of potential rechargings to the remote server. The remote server may provide the number of potential rechargings to the rechargeable device in response to this request. As another example, the power bank application may be associated with a push notification server. Accordingly, the remote server may monitor the number of potential rechargings of the rechargeable device to detect one or more alert conditions (e.g., there is only the partial first recharging remaining, there number of potential rechargings dropped below an integer value, the power bank fuel gauge dropped below a threshold value, etc.). In response to detecting the alert condition, the remote server may transmit, via the push notification server, a push notification indicating the number of potential recharging for presentation via an alert user interface at the rechargeable device. As another example, the remote server may be associated with a web interface accessible by personal electronic devices (including the rechargeable device). Accordingly, in response to detecting an indication to present the user interface via the web interface, the remote server may transmit the number of potential rechargings to the personal electronic device. As yet another example, the remote server may transmit the determined number of potential rechargings for display via an I/O of the power bank (such as a limited-capacity display screen).

The method 600 may include additional, fewer, or alternate actions, in various embodiments. For example, in some embodiments, the method 600 further includes obtaining a third efficiency factor corresponding specifically to the electrical connection, and the determining of the number of potential rechargings is further based upon the third efficiency factor. In some embodiments, a single charging efficiency factor is applied to account for all efficiency losses between the power bank battery and the mobile computing device battery (instead of two or more separate charging efficiency factor). Additionally or alternatively, in some embodiments, the method 600 includes additional actions to determine state of health of the power bank battery and/or the mobile computing device battery (e.g., monitoring inflowing and/or outflowing current or power from a battery, in order to provide actual capacities of the power bank battery and/or the mobile computing device battery).

As another example, the method 600 may include determining the number of potential rechargings for a first rechargeable device, the remote server may also determine a number of potential rechargings for any number of other rechargeable devices associated with the user profile by following the actions described above with respect to steps 604, 608, 610, and 612. As yet another example, the method 600 may include monitoring the fuel gauge level of rechargeable device for compliance with a recharging plan (e.g., indications of a fuel gauge level at which the power bank should start and/or stop recharging the rechargeable device). Accordingly, upon detecting the appropriate fuel gauge level, the remote server may be configured to transmit, via the communication module, an interrupt or reconnect signal to the power bank to cause the power bank to stop or start recharging the rechargeable device (e.g., by toggling the state of the switch 232 of FIG. 2). As still another example, the method 600 may include determining a number of times a particular function of the rechargeable device can be activated based on the second fuel gauge signal and/or the number of potential rechargings. In some embodiments, at least some actions of the method 600 are performed by the power bank (e.g., the power bank determines the number of potential rechargings and transmits the determined number to the remote server to ensure the user profile maintains current data).

ADDITIONAL CONSIDERATIONS

All of the foregoing computer systems may include additional, less, or alternate functionality, including that discussed herein. All of the computer-implemented methods may include additional, less, or alternate actions, including those discussed herein, and may be implemented via one or more local or remote processors and/or transceivers, and/or via computer-executable instructions stored on computer-readable media or medium.

The processors, transceivers, mobile devices, and/or other computing devices discussed herein may communicate with each via wireless communication networks or electronic communication networks. For instance, the communication between computing devices may be wireless communication or data transmission over one or more radio links, or wireless or digital communication channels.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

The systems and methods described herein are directed to improvements to computer functionality, and improve the functioning of conventional computers.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A computer-implemented method comprising:
   receiving, from a power bank device configured to supply electric charge to a battery of a rechargeable device external to the power bank device, a first fuel gauge signal indicative of a present fuel gauge of the power bank, the present fuel gauge of the power bank device corresponding to a percentage of a capacity of a battery of the power bank device;
   obtaining, via the rechargeable device, a second fuel gauge signal indicative of a present fuel gauge of the rechargeable device, the present fuel gauge of the rechargeable device corresponding to a percentage of a capacity of a battery of the rechargeable device;
   determining, via one or more processors, a first charging efficiency factor of the power bank battery, the first charging efficiency factor being determined based upon the first fuel gauge signal;
   determining, via the one or more processors, a second charging efficiency factor of the rechargeable device battery, the second charging efficiency factor being determined based upon the second fuel gauge signal;
   generating, via the one or more processors, a number of potential rechargings of the rechargeable device from the power bank device, each of the potential rechargings corresponding to charging of the rechargeable device battery to a desired fuel gauge, the desired fuel gauge corresponding to a second percentage of the capacity of the rechargeable device battery, and the number of rechargings being determined based at least on the desired fuel gauge, the present fuel gauge of the rechargeable device, the present fuel gauge of the power bank device, and the first and second charging efficiency factors; and providing, to a user interface, an indication of the number of potential rechargings of the rechargeable device.

2. The computer-implemented method of claim 1, further comprising:

responsive to determining the first charging efficiency factor, accessing, via the one or more processors, a user profile to obtain a charging efficiency factor and a desired fuel gauge for a second rechargeable device battery; and generating, via the one or more processors, a number of potential rechargings of the second rechargeable device battery from the power bank device, each of the potential rechargings corresponding to charging of the second rechargeable device battery to the desired fuel gauge of the second rechargeable device battery.

3. The computer-implemented method of claim 2, wherein providing the indication of the number of potential rechargings of the rechargeable device comprises:

providing, to the user interface, an indication of the number of potential rechargings of the second rechargeable device.

4. The computer-implemented method of claim 2, further comprising:

based on the desired fuel gauge of the rechargeable device, the present fuel gauge of the rechargeable device, the present fuel gauge of the power bank device, and the first and second charging efficiency factors, predicting, via the one or more processors, a remaining fuel gauge for the power bank device after a recharging of the rechargeable device to the desired fuel gauge; and adjusting, via the one or more processors, the number of potential rechargings of the second rechargeable device battery from the power bank device based upon the predicted fuel gauge of the power bank device.

5. The computer-implemented method of claim 1, wherein providing the indication of the number of potential rechargings of the rechargeable device comprises:

accessing, via the one or more processors, a user profile to obtain an indication of a personal electronic device, wherein the personal electronic device is one of a smart television, a smart home hub, or a mobile computing device; and providing, via the one or more processors, the number of potential rechargings of the rechargeable device to the personal electronic device.

6. The computer-implemented method of claim 1, wherein the desired fuel gauge is less than 90% of the capacity of the rechargeable device battery.

7. The computer-implemented method of claim 6, further comprising:

transmitting, to the power bank device, an interrupt signal when the present fuel gauge of the rechargeable device is substantially equal to the desired fuel gauge of the rechargeable, the interrupt signal configured to cause the power device to interrupt charging of the rechargeable device battery.

8. The computer-implemented method of claim 7, wherein transmitting the interrupt signal to the power bank device comprises:

transmitting, to the rechargeable device, the interrupt signal, wherein the interrupt signal is configured to cause the rechargeable device to relay the interrupt signal to the power bank device.

9. The computer-implemented method of claim 1, wherein obtaining the second fuel gauge signal comprises:

receiving, via a communication link between the rechargeable device and the one or more processors, the second fuel gauge signal.

10. The computer-implemented method of claim 1, wherein obtaining the second fuel gauge signal comprises:

receiving, via a communication link between the power bank device and the one or more processors, the second fuel gauge signal.

11. The computer-implemented method of claim 1, wherein the first fuel gauge signal includes an indication of a measured power output efficiency of the power bank.

12. The computer-implemented method of claim 1, wherein the second fuel gauge signal includes an indication of a measured power input efficiency of the rechargeable device.

13. The computer-implemented of claim 1, further comprising:

determining, by the one or more processors, a number of times a particular function of the rechargeable device can be activated based on the second fuel gauge signal and/or the number of potential rechargings; and providing, to the user interface, an indication of the number of times a particular function of the rechargeable device can be activated.

14. A system comprising:

one or more processors;

one or more transceivers configured to exchange communication signals with at least one of a power bank device and a rechargeable device, wherein the power bank device configured to supply electric charge to a battery of the rechargeable device; and a non-transitory memory storing computer executable instructions that, when executed via the one or more processors, cause the system to:

receive, via the one or more transceivers, a first fuel gauge signal indicative of a present fuel gauge of the power bank, the present fuel gauge of the power bank device corresponding to a percentage of a capacity of a battery of the power bank device, obtain, via the one or more transceivers, a second fuel gauge signal indicative of a present fuel gauge of the rechargeable device, the present fuel gauge of the rechargeable device corresponding to a percentage of a capacity of a battery of the rechargeable device, determine a first charging efficiency factor of the power bank battery, the first charging efficiency factor being determined based upon the first fuel gauge signal, determine a second charging efficiency factor of the rechargeable device battery, the second charging efficiency factor being determined based upon the second fuel gauge signal, generate a number of potential rechargings of the rechargeable device from the power bank device, each of the potential rechargings corresponding to charging of the rechargeable device battery to a desired fuel gauge, the desired fuel gauge corresponding to a second percentage of the capacity of the rechargeable device battery, and the number of rechargings being determined based at least on the desired fuel gauge, the present fuel gauge of the rechargeable device, the present fuel gauge of the power bank device, and the first and second charging efficiency factors, and provide, to a user interface, an indication of the number of potential rechargings of the rechargeable device.

15. The system of claim 14, wherein the instructions, when executed, cause the system to:
responsive to determining the first charging efficiency factor, access a user profile to obtain a charging efficiency factor and a desired fuel gauge for a second rechargeable device battery; and
generate a number of potential rechargings of the second rechargeable device battery from the power bank device, each of the potential rechargings corresponding to charging of the second rechargeable device battery to the desired fuel gauge of the second rechargeable device battery.

16. The system of claim 15, wherein to provide the indication of the number of potential rechargings of the rechargeable device, the instructions, when executed, cause the system to:
provide, to the user interface, an indication of the number of potential rechargings of the second rechargeable device.

17. The system of claim 15, wherein the instructions, when executed, cause the system to:
based on the desired fuel gauge of the rechargeable device, the present fuel gauge of the rechargeable device, the present fuel gauge of the power bank device, and the first and second charging efficiency factors, predict a remaining fuel gauge for the power bank device after a recharging of the rechargeable device to the desired fuel gauge; and
adjust the number of potential rechargings of the second rechargeable device battery from the power bank device based upon the predicted fuel gauge of the power bank device.

18. The system of claim 14, wherein to provide the indication of the number of potential rechargings of the rechargeable device, the instructions, when executed, cause the system to:
access a user profile to obtain an indication of a personal electronic device, wherein the personal electronic device is one of a smart television, a smart home hub, or a mobile computing device; and
provide the number of potential rechargings of the rechargeable device to the personal electronic device.

19. The system of claim 14, wherein the desired fuel gauge is less than 90% of the capacity of the rechargeable device battery.

20. The system of claim 19, wherein the instructions, when executed, cause the system to:
transmit, to the power bank device, an interrupt signal when the present fuel gauge of the rechargeable device is substantially equal to the desired fuel gauge of the rechargeable, the interrupt signal configured to cause the power device to interrupt charging of the rechargeable device battery.

21. The system of claim 20, wherein to transmit the interrupt signal to the power bank device, the instructions, when executed, cause the system to:
transmit, to the rechargeable device, the interrupt signal, wherein the interrupt signal is configured to cause the rechargeable device to relay the interrupt signal to the power bank device.

22. The system of claim 14, wherein to obtain the second fuel gauge signal, the instructions, when executed, cause the system to:
receive, via a communication link between the rechargeable device and the one or more transceivers, the second fuel gauge signal.

23. The system of claim 14, wherein to obtain the second fuel gauge signal, the instructions, when executed, cause the system to:
receive, via a communication link between the power bank device and the one or more transceivers, the second fuel gauge signal.

24. The system of claim 14, wherein the instructions, when executed, cause the system to:
determine a number of times a particular function of the rechargeable device can be activated based on the second fuel gauge signal and/or the number of potential rechargings; and
provide, to the user interface, an indication of the number of times a particular function of the rechargeable device can be activated.

* * * * *